United States Patent [19]

Kigawa

[11] 4,326,473
[45] Apr. 27, 1982

[54] SEWING CONTROL SYSTEM FOR MULTIPLE-PATTERN SEWING MACHINE

[75] Inventor: Teruo Kigawa, Tokyo, Japan

[73] Assignee: Tokyo Shibaura Electric Co., Ltd., Japan

[21] Appl. No.: 94,342

[22] Filed: Nov. 14, 1979

Related U.S. Application Data

[63] Continuation of Ser. No. 908,649, May 23, 1978, abandoned.

[30] Foreign Application Priority Data

May 23, 1977 [JP] Japan .................. 52-59688

[51] Int. Cl.³ ............................. D05B 3/02
[52] U.S. Cl. ............................. 112/158 E
[58] Field of Search ............ 112/121.12, 121.11, 112/158 E

[56] References Cited

U.S. PATENT DOCUMENTS

| | | | |
|---|---|---|---|
| 3,982,491 | 9/1976 | Herzer et al. | 112/121.12 |
| 4,050,393 | 9/1977 | Welcher et al. | 112/121.12 |
| 4,142,473 | 3/1979 | Itoh | 112/158 E |

*Primary Examiner*—Peter P. Nerbun

*Attorney, Agent, or Firm*—Finnegan, Henderson, Farabow, Garrett & Dunner

[57] ABSTRACT

A sewing control system for multiple-pattern sewing machine has a microprocessor coupled with a memory unit (ROM and/or RAM) and a switch matrix for designating a desired stitch pattern to achieve automatic sewing of a variety of stitch patterns. For stitch data formats processed by the microprocessor, there are used fixed-length or variable-length data including an operation code for designating data operations and a stitching frequency and a symbol code for designating the length and direction of a unit stitch. The memory unit stores a plurality of pattern data consisting of a number of stitch data each corresponding to the stitch pattern and a selection program for selecting the desired stitch pattern among these pattern data. When the desired pattern data designated by the switch matrix is selected among the pattern data in accordance with the selection program, A sewing machine provided with the control system performs sewing operation with the length and direction of each stitch specified as a vector in polar coordinates in accordance with the desired pattern data.

62 Claims, 75 Drawing Figures

F I G. 1
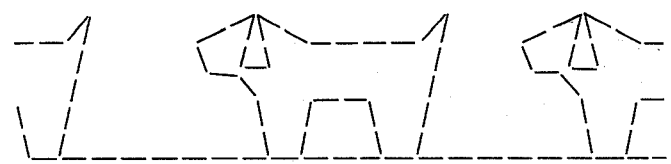
F I G. 2
F I G. 3
F I G. 4
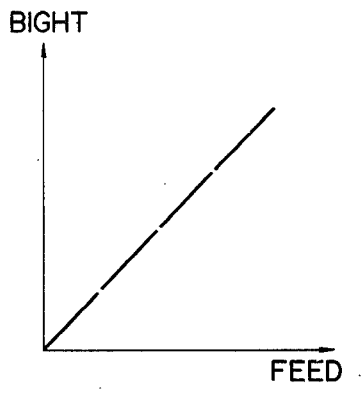
F I G. 5
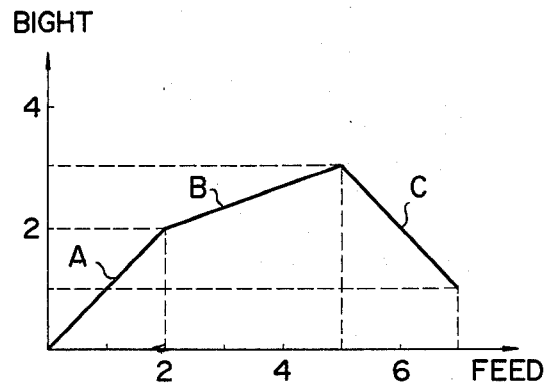

FIG. 8
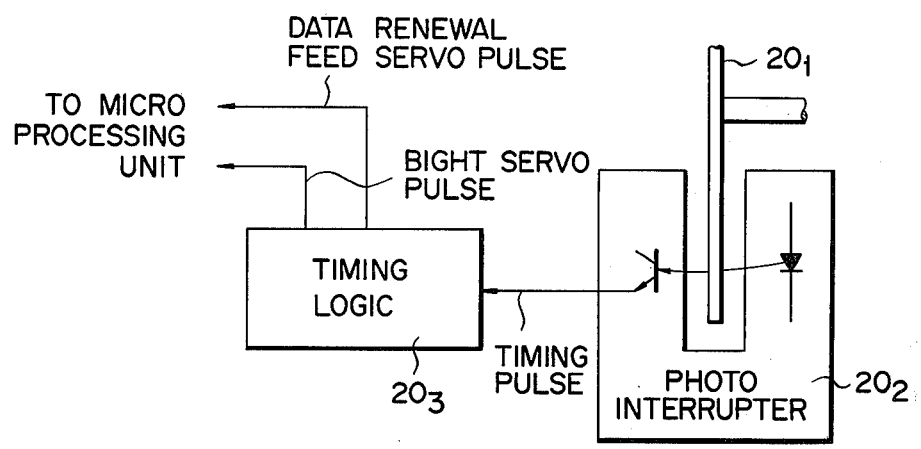
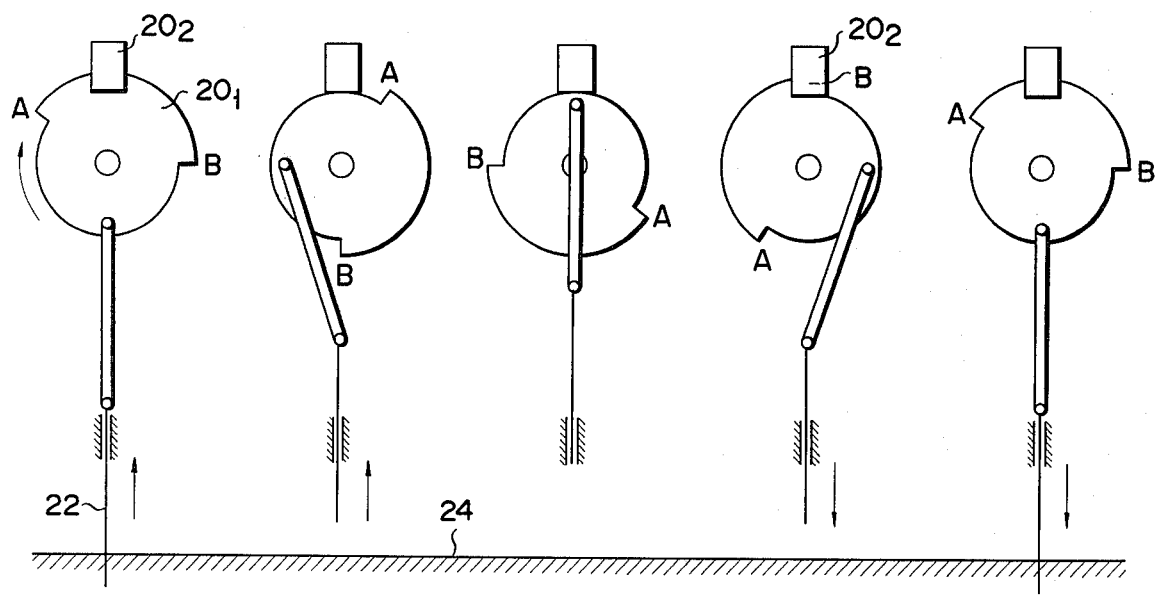
FIG. 9a  FIG. 9b  FIG. 9c  FIG. 9d  FIG. 9e

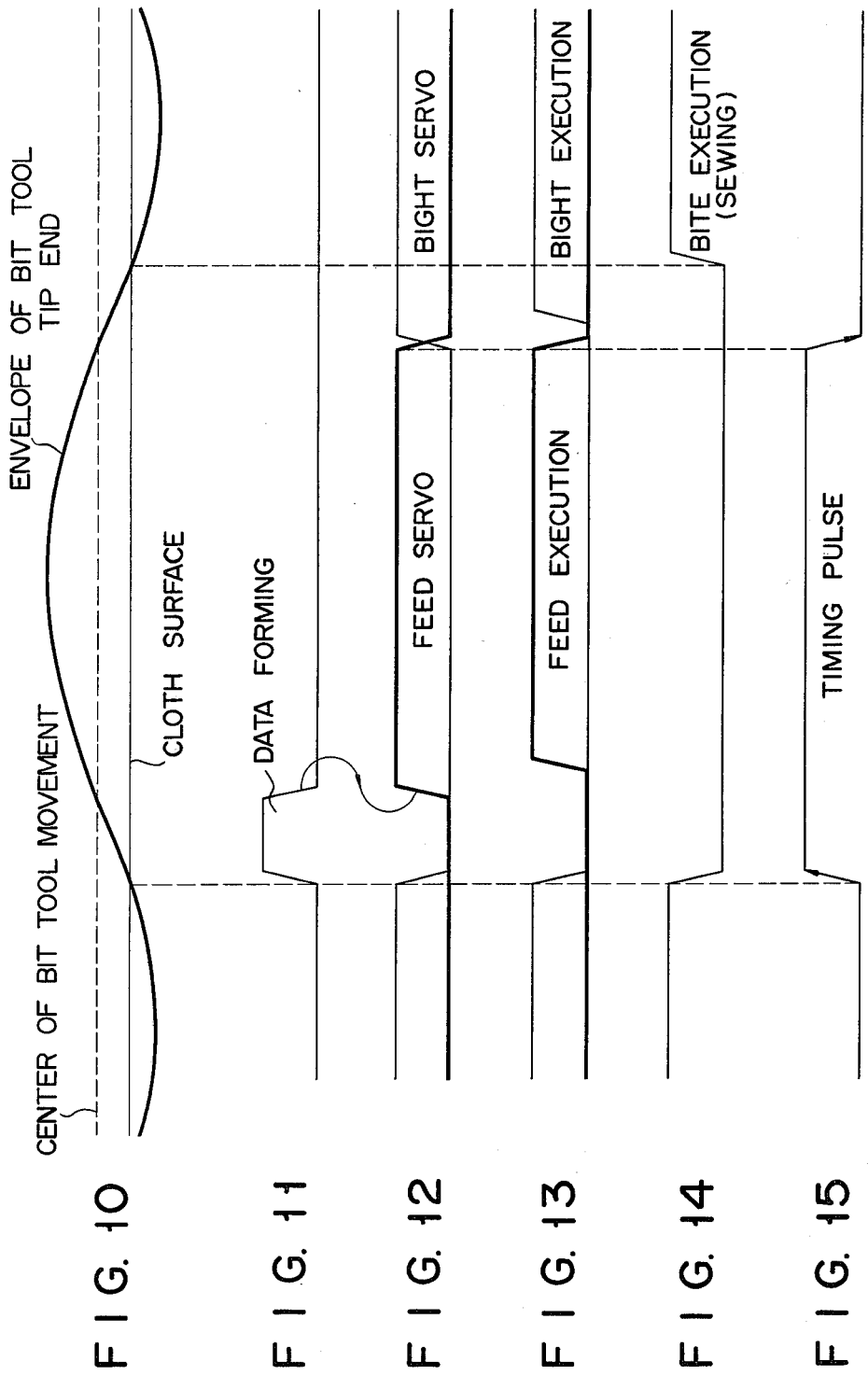

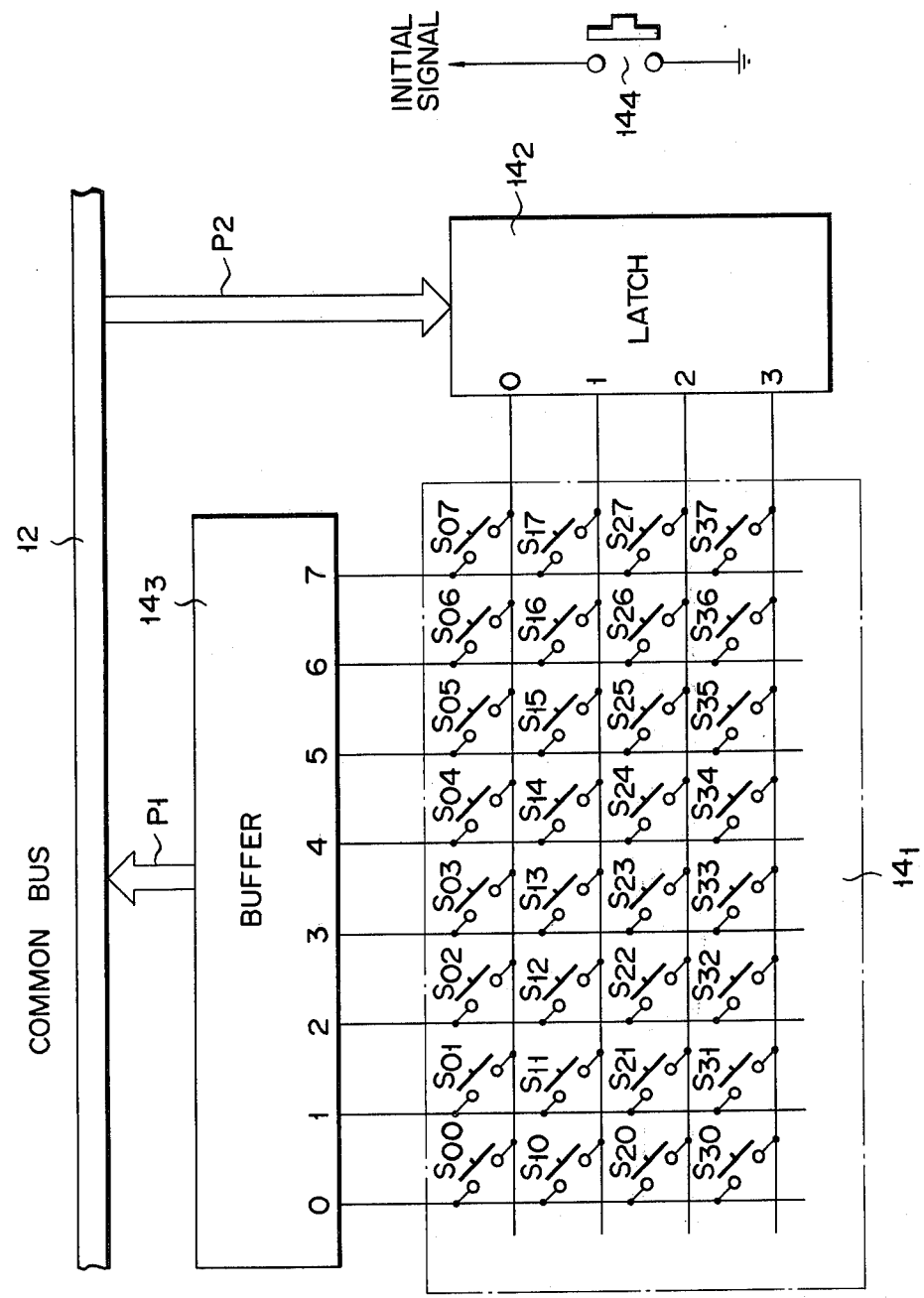

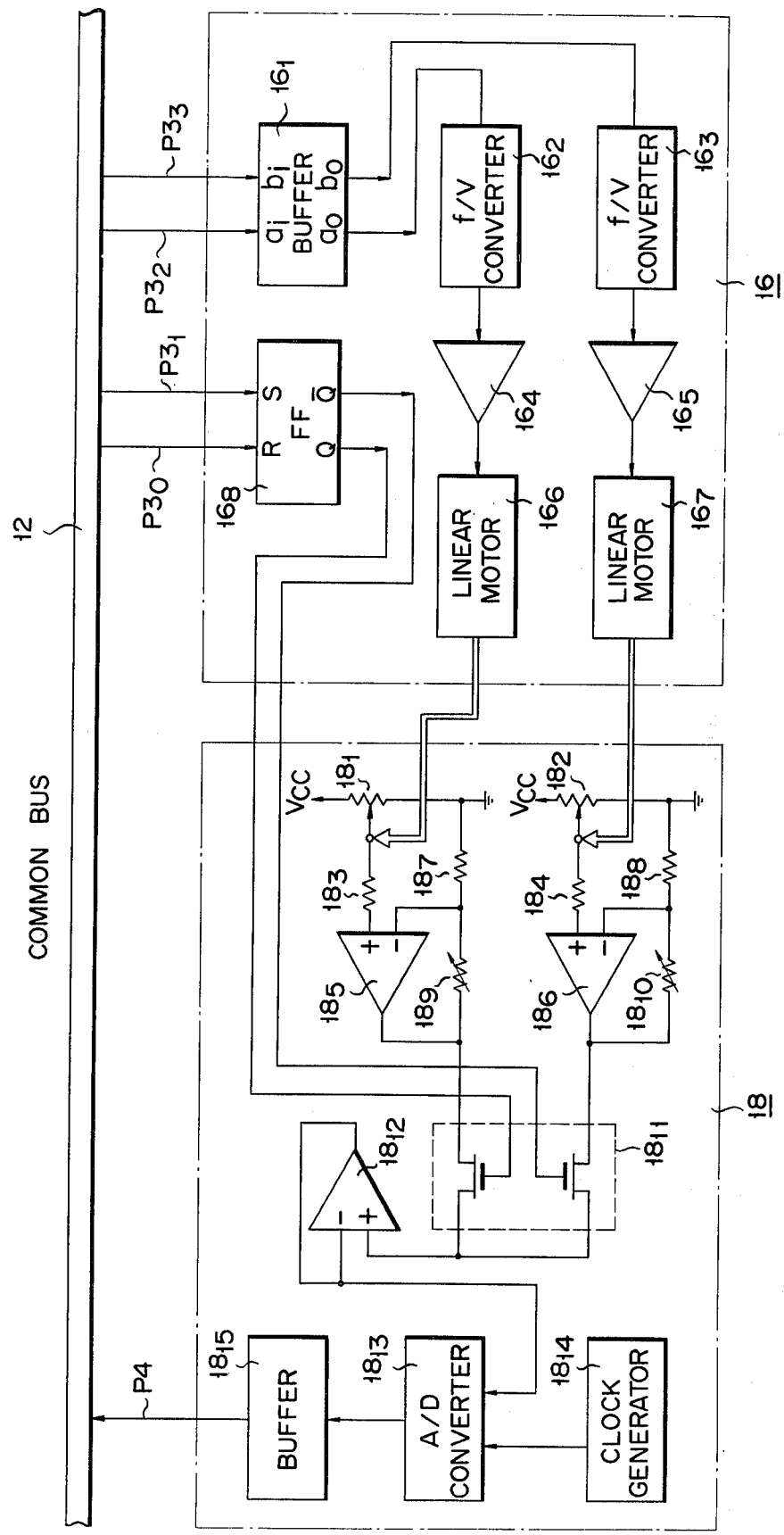

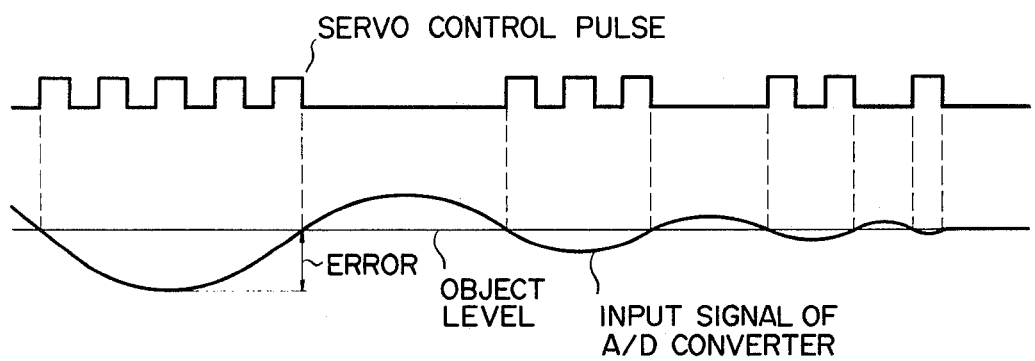

| 7 | 6 | 5 | 4 3 2 1 0 |
|---|---|---|---|
| N/ID | I/D | A/S | BIGHT OPERAND |
| n ||| FEED OPERAND |

FIG. 40

| | |
|---|---|
| R1 | STITCH DATA 1ST. ADDRESS |
| R2 | STITCH DATA INDEX ADDRESS |
| R3 | +/-     FEED OPERAND FO |
| R4 | +/-     BIGHT OPERAND BO |
| R5 | STITCHING FREQUENCY n(n1 OR n2) |
| N | REPETITION FREQUENCY N |
| A1 | S    A/S    n1 |
| A2 | M/D    SL    n2 |
| C | C |
| RF | FEED DATA FD |
| RB | BIGHT DATA BD |

FIG. 42

| | | | | |
|---|---|---|---|---|
| R1 | \multicolumn{4}{c}{STITCH DATA 1ST. ADDRESS} |
| R2 | \multicolumn{4}{c}{STITCH DATA INDEX ADDRESS} |
| R3 | N/ID | I/D | A/S | BIGHT OPERAND BO |
| R4 | \multicolumn{2}{c}{n} | \multicolumn{2}{c}{FEED DATA FD} |
| A1 | N/ID | I/D | A/S | BO |
| A2 | \multicolumn{2}{c}{n} | \multicolumn{2}{c}{FD} |
| B1 | N/ID | I/D | A/S | BO |
| B2 | \multicolumn{2}{c}{n} | \multicolumn{2}{c}{FD} |
| N | \multicolumn{4}{c}{REPETITION FREQUENCY N} |
| n | \multicolumn{4}{c}{STITCHING FREQUENCY n} |
| K | \multicolumn{4}{c}{A·B LINE'S STITCH DATA DISCRIMINATION SIGN K} |
| C | \multicolumn{4}{c}{C} |
| RF | | | \multicolumn{2}{c}{FEED DATA FD} |
| RB | | | \multicolumn{2}{c}{BIGHT DATA BD} |

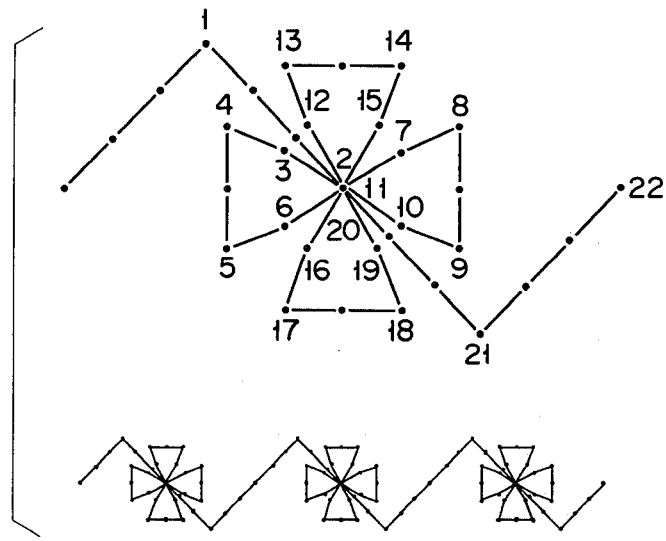
FIG. 48
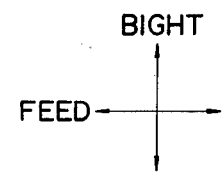
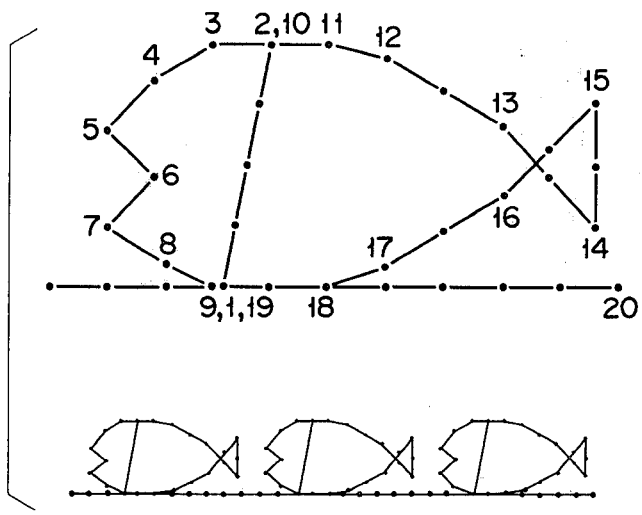
FIG. 49

F I G. 50
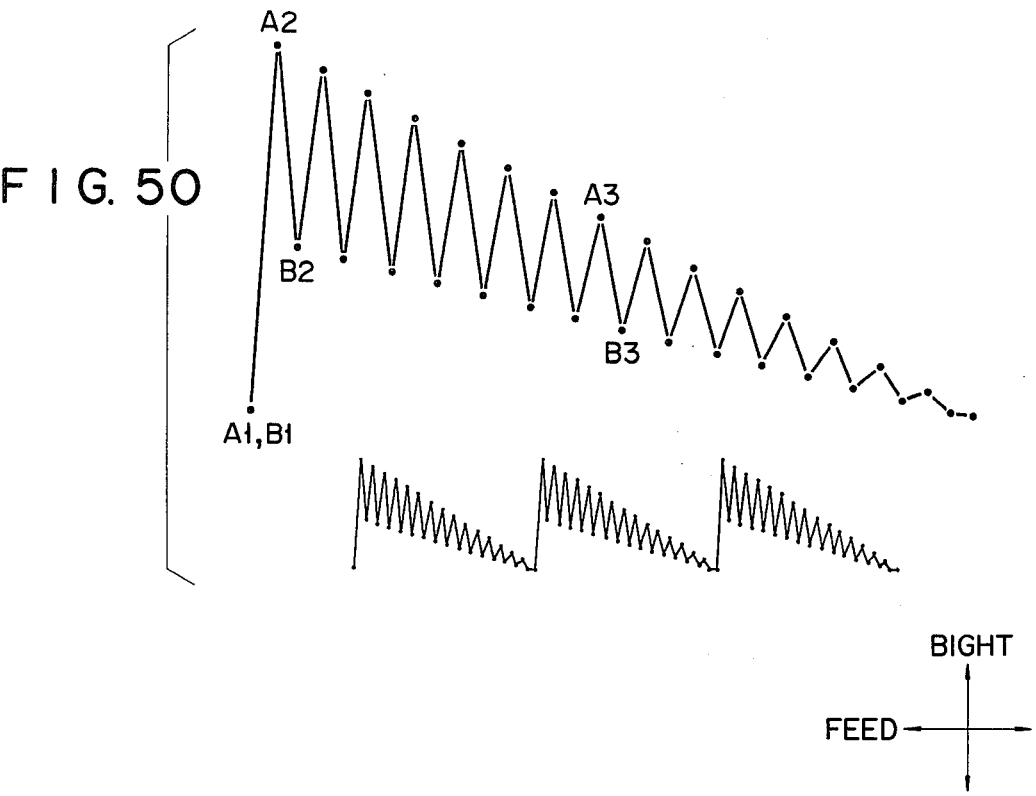
F I G. 51
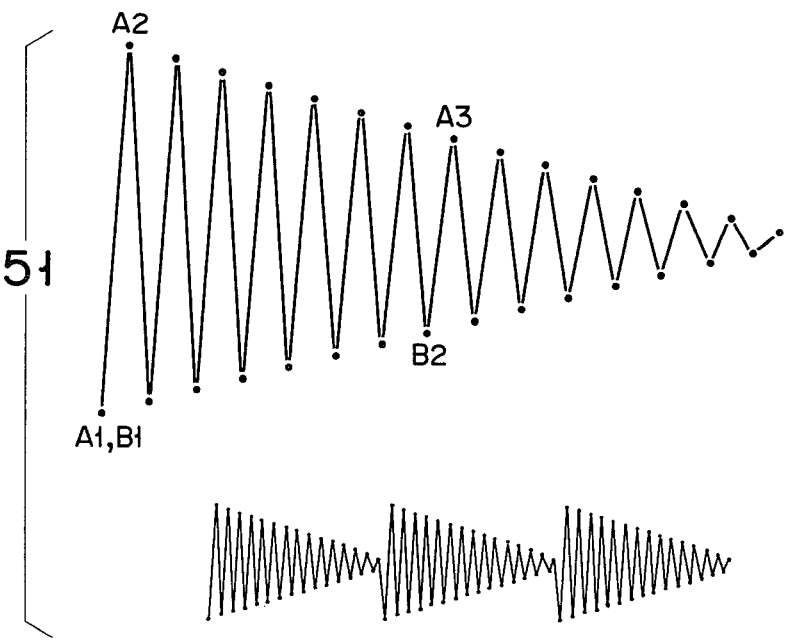

FIG. 52
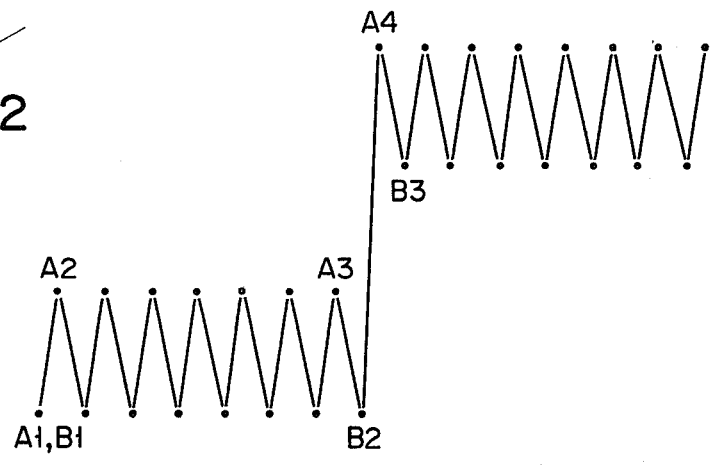
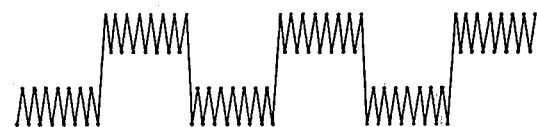
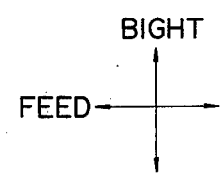
FIG. 53
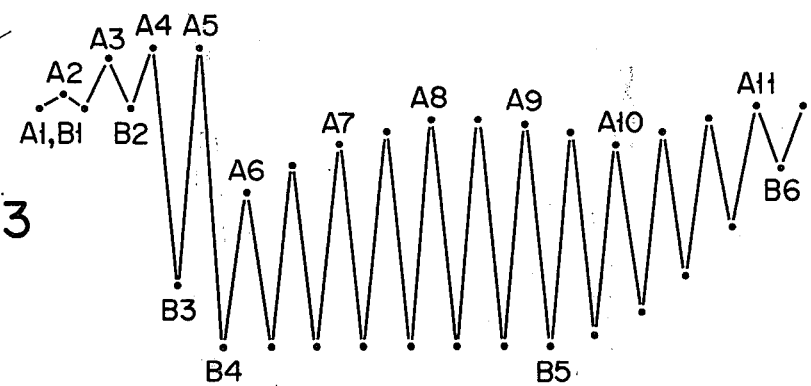
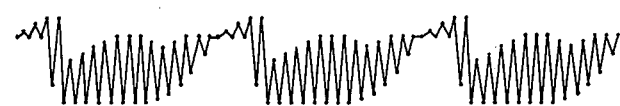

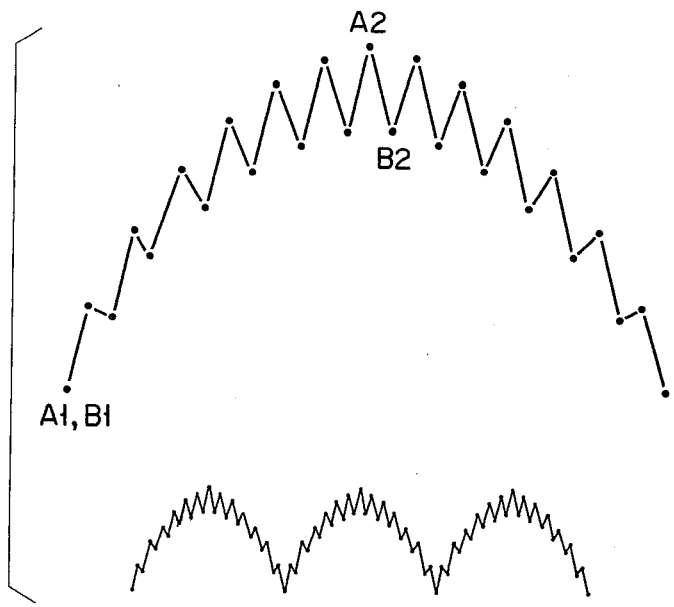
F I G. 54
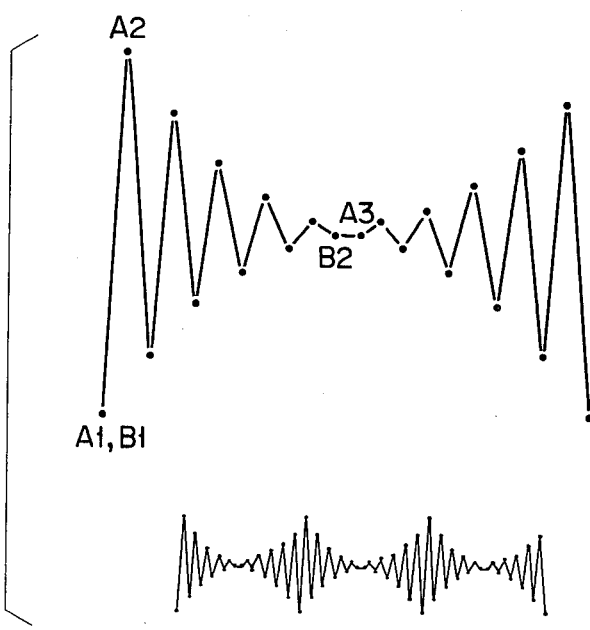
F I G. 55

FIG. 56
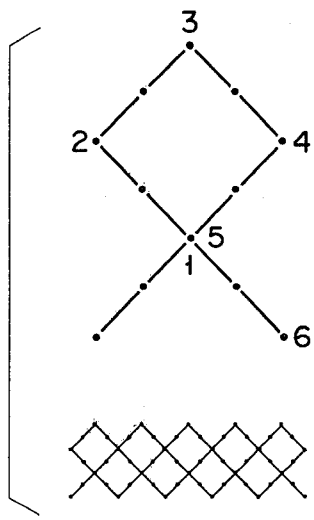
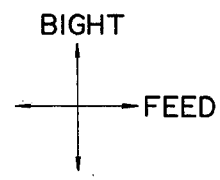
FIG. 57
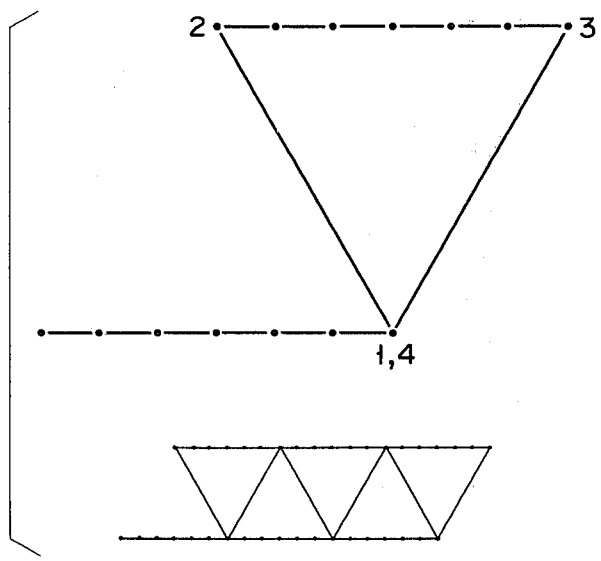

F I G. 58
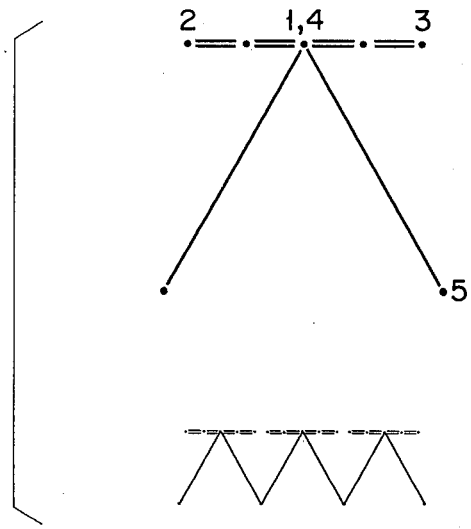
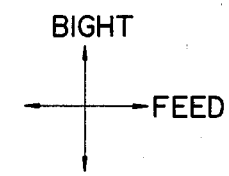
F I G. 59
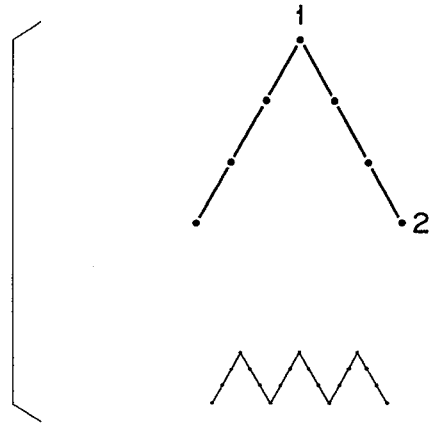

BIGHT
FEED

FIG. 62
FIG. 63
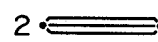
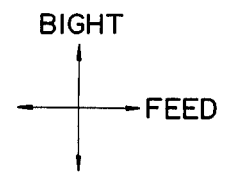
FIG. 64
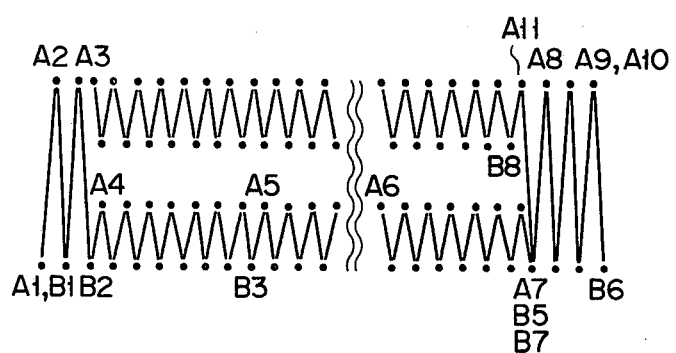

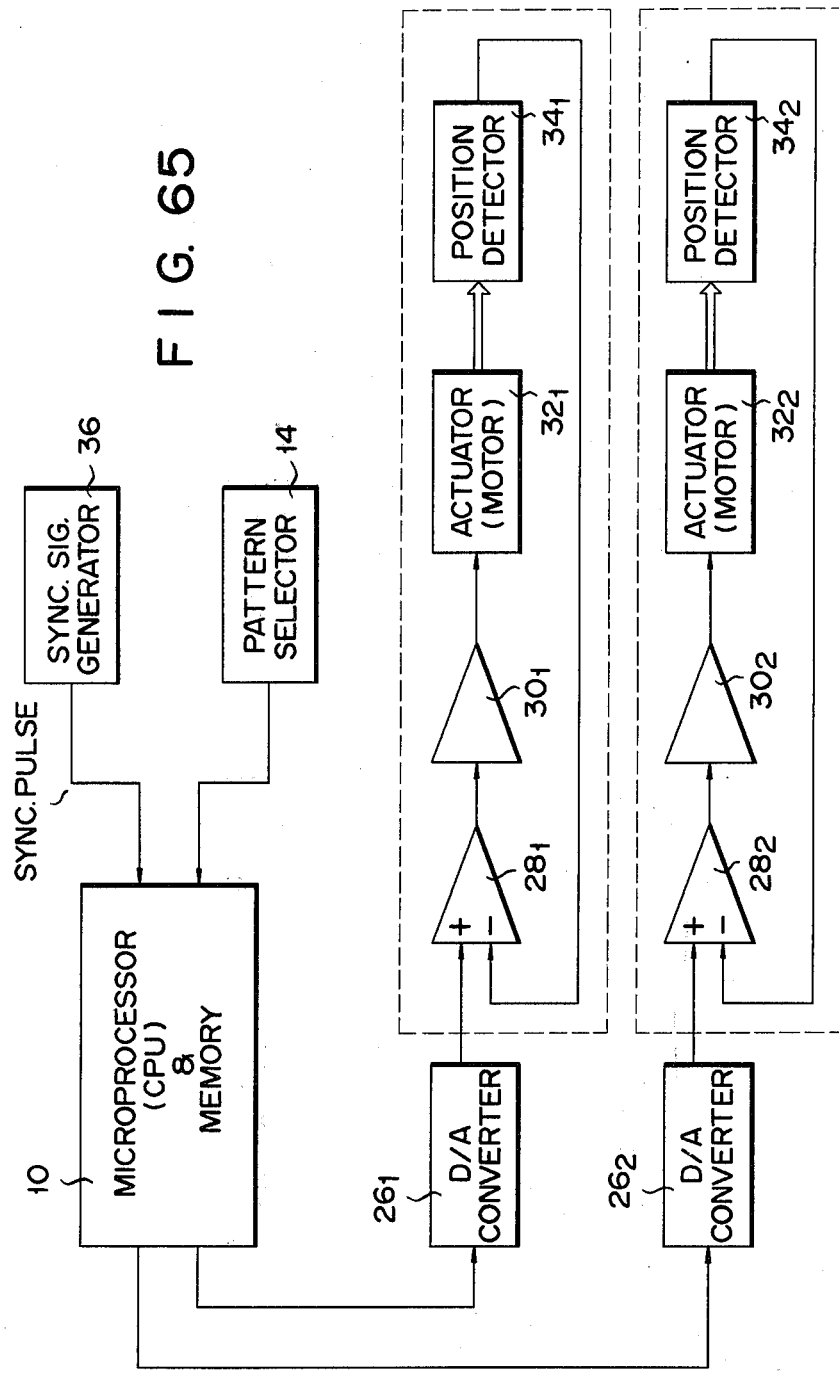
F I G. 65

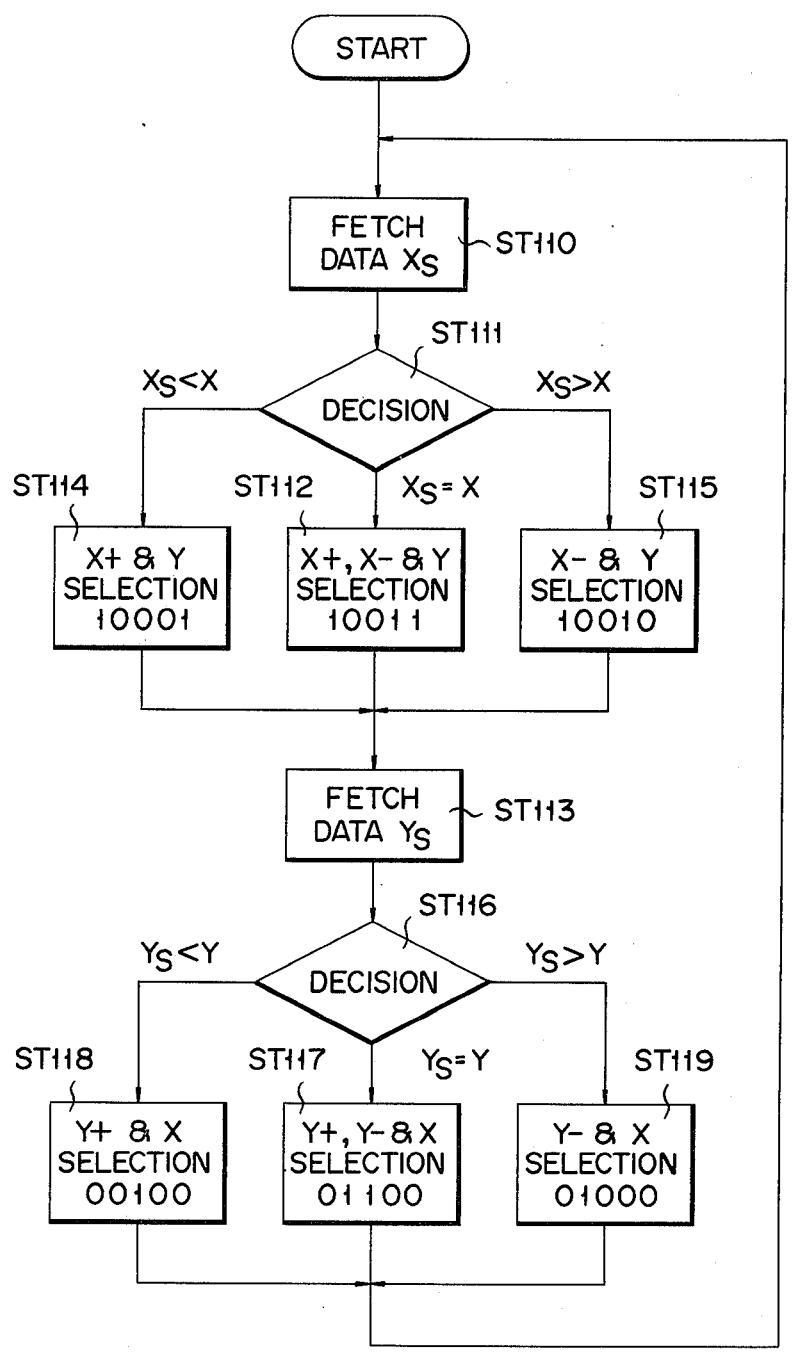
F I G. 68

SEWING CONTROL SYSTEM FOR MULTIPLE-PATTERN SEWING MACHINE

This is a continuation of application Ser. No. 908,649, filed May 23, 1978, now abandoned.

BACKGROUND OF THE INVENTION

This invention relates to a sewing control system and a sewing control method for multiple-pattern sewing machines which employ digital codes as data for forming stitch patterns as well as a data processor for the control of sewing operation.

Heretofore, in a multiple-pattern sewing machine utilizing digital codes as data for automatically forming stitch patterns, a stitch pattern specified by means of a bight amount or a transverse needle shift and a feed amount or a longitudinal cloth feed has been formed in the following procedure, for example. That is, prepared as a stitch data in a static memory (ROM) is a digital code consisting of bight and feed data each in 5 bits which correspond to each individual stitch by 1:1. (Here, one stitch data is used for forming one stitch or one seam.) Then, scores of stitch data sets for forming a specified (or desired) stitch pattern are successively taken out of the ROM in accordance with the designation from a digital counter synchronized with the sewing action of the sewing machine. Thereupon, the sewing machine performs a cycle of sewing operation corresponding by 1:1 to each individual stitch data derived according to the designation by the digital counter, thereby forming the specified stitch pattern of a piece on cloth. In such sewing machine as described above, however, one stitch data is required for each stitch, so that a great number of digital codes are needed to form a complicated stitch pattern, or continuously to form a variety of stitch patterns. Consequently, in the prior art multiple-pattern sewing machines, the total number of data required may reach an enormous value, inevitably requiring a memory unit of large capacity.

SUMMARY OF THE INVENTION

An object of this invention is to provide a control system for multiple-pattern sewing machines, including a data processor for the control of sewing operation and ensuring smooth sewing.

Another object of the invention is to provide a control system for multiple-pattern sewing machines which is able to minimize the capacity of a memory means used for the control of sewing operation by employing stitch data stored in the addresses of the memory means each of which contains information relating to a plurality of stitches.

Still another object of the invention is to provide a control system for multiple-pattern sewing machine, having the control system's construction simplified by the use of stitch data with high information density as well as a data processor.

An additional object of the invention is to provide a control system for multiple-pattern sewing machine, in which the construction of a means for designating a desired stitch pattern among a number of stitch patterns is simplified by using a switch matrix therefor.

According to this invention, the foregoing and other objects are attained by providing a sewing control system for a multiple-pattern sewing machine which comprises; a memory means for storing a plurality of sets of pattern data; a designation means for designating a desired set among the plurality of sets of pattern data; a data processor means coupled with the memory means and designation means to sequentially supply sewing control signals corresponding to the pattern data designated by the designation means; an actuator means coupled with the data processor means so as to perform sewing operation in response to each sewing control signal in order to form on a workpiece a pattern corresponding to the pattern data designated by the designation means; a timing signal generator means coupled with the data processor means and actuator means for indicating the timing for each cycle of the sewing operation to the data processor means.

BRIEF DESCRIPTION OF THE DRAWINGS

FIG. 1 shows an example of the straight pattern formed of stitches themselves;

FIG. 2 shows an example of the zigzag pattern formed of bent points of zigzag stitches;

FIG. 3 shows an example of the stitch pattern combining both characteristics of the straight and zigzag stitches;

FIG. 4 shows how a long straight stitch is formed of a plurality of short straight stitches;

FIG. 5 illustrates the correlation between the stitches based on feed and bight data and the coordinate data, as shown in Table 1;

FIG. 8 is a block diagram showing more definite configuration of the timing signal generator as shown in FIG. 6;

FIGS. 9a to 9e illustrate the mechanical relation between the vertical position of the bit tool of the sewing machine and the timing signal generator of FIG. 8 at intervals of ¼ machine cycle;

FIG. 9f illustrates the mechanical relation between the bit tool of the sewing machine and the timing signal generator of FIG. 8a;

FIG. 10 shows an envelope of the tip-end motion of the bit tool as shown in FIGS. 9a to 9e;

FIGS. 11 to 15 illustrate how the multiple-pattern sewing machine according to the invention performs when the mechanical relation between the bit tool and the timing signal generator is as shown in FIGS. 8 to 10;

FIG. 16 shows a detailed configuration of the pattern selector as shown in FIG. 6;

FIG. 17 shows detailed configurations of the bight and feed driver and position detector as shown in FIG. 6;

FIG. 18 illustrates the process of bight and feed servocontrol performed on the basis of the construction as shown in FIG. 17;

FIGS. 19 and 21 illustrate fixed-length stitch data formats for forming straight patterns, provided for the multiple-pattern sewing machines according to the invention;

FIGS. 20 and 22 illustrate variable-length stitch data formats for forming straight patterns, provided for the multiple-pattern sewing machine according to the invention;

FIG. 40 illustrates the conditions of data stored in the several registers for straight stitches included in the microprocessing unit as shown in FIG. 6;

FIG. 42 illustrates the conditions of data stored in the several registers for zigzag stitches included in the microprocessing unit as shown in FIG. 6;

FIGS. 46 to 49 show examples of the straight stitch pattern formed by using the stitch data format for straight patterns;

FIGS. 50 to 55 shows examples of the zigzag stitch pattern formed by using the stitch data format for zigzag patterns;

FIGS. 56 to 64 show examples of the utility stitch pattern formed by using both the stitch data formats for straight and zigzag patterns;

FIG. 65 is a block diagram showing a configuration of the control system for the multiple-pattern sewing machine according to the invention, in which the feed and bight servocontrol is performed by means of an analog servoloop;

FIG. 68 is a flow chart illustrating a position control program for the digital servocontrol as shown in FIG. 67.

DESCRIPTION OF THE PREFERRED EMBODIMENTS

Figure 6:
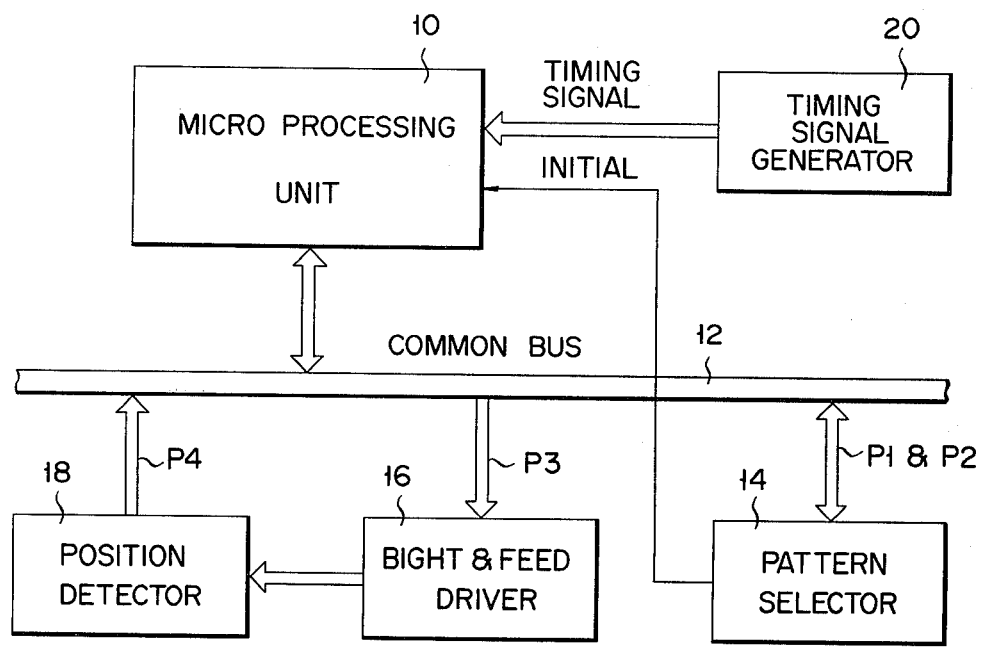
FIG. 6 is a block diagram showing the configuration of the control system for multiple-pattern sewing machines according to this invention.

Now there will be described preferred embodiments of this invention in connection with the accompanying drawings, in which like reference numerals refer to the same or similar parts throughout the several views in order to avoid repeated description.

In general, stitch patterns formed on multiple-pattern sewing machines may be classified broadly into the following two types.
 (1) Stitch patterns whose outlines are formed of straight patterns, i.e. stitches or seams themselves, as shown in FIG. 1.
 (2) Stitch patterns whose outlines are formed of zigzag patterns, i.e. bent points of zigzag stitches, as shown in FIG. 2.

Although the stitch patterns may be divided into the two main groups as aforesaid, some patterns combine the features of both these groups. By way of example, there is given a stitch pattern formed in such a manner as shown in FIG. 3.

The aforementioned stitch patterns are formed in accordance with bight and feed data provided, as required, synchronously with the sewing operation of the sewing machine. At present, in a regular sewing machine with a cam mechanism for the formation of the stitch patterns, the maximum bight amount (vertical length or height of the stitch patterns in the drawings) is approximately 6 mm, while the maximum feed amount (horizontal length or width of the stitch patterns in the drawings) is approximately 3 mm per stitch.

As regards the formation of these stitch patterns, this invention has the following features and advantages.
 (a) The stitch data may be displayed digitally.
 (b) Since the stitches are formed on a two-dimensional plane, each stitch may be indicated by a symbolic vector with component values relative to the respective suitable reference values of the bight and feed data.
 (c) Since the bight and feed amounts for one stitch are limited, a long stitch is formed of repeated short stitches, as shown in FIG. 4, whereby stitches with attractive appearances may be obtained.
 (d) Since the cloth or workpiece on which a stitch pattern is to be formed is carried only in the feed direction, the formation range for the stitch pattern is circumscribed within the maximum range for the shift of the sewing needle position.

That is, in this invention, each individual stitch is regarded as a vector, and a straight pattern is expressed as the sum of vectors corresponding to the several stitches. Setting the bight and feed directions in rectangular coordinates, let us suppose the cases of such bight and feed data as shown in Table 1.

TABLE 1

| Feed Data | Bight Data | Coordinate Data |
|---|---|---|
| 2 | 2 | A (2, 2) |
| 3 | 3 | B (5, 3) |
| 2 | 1 | C (7, 1) |

Hereupon, the bight component of the coordinates to express one stitch corresponds equivalently to the bight data applied to a bight driving mechanism while such stitch is being formed, as shown in FIG. 5. On the other hand, the feed component obtained at the same point of time corresponds to the total sum of the feed data applied to a feed driving mechanism with respect to the whole series of stitches from the origin (starting point of the initial stitch) to the last stitch.

FIG. 6 is a block diagram showing the configuration of a control system of the multiple-pattern sewing machine, in which a data processor, i.e. a microprocessing unit 10, includes a microprocessor (CPU) with each word formed of 8 bits (1 byte) and a read-only memory (ROM) and/or read and write memory (RAM). Previously stored in the ROM/RAM are a pattern data selection program, a bight and feed data forming program, varied kinds of pattern data, and bight and feed operands corresponding respectively to a plurality of symbolic vectors (basic vectors). The unit 10 is coupled with an 8-bit column bus 12, which is coupled with a pattern selector 14 for selecting specified (desired) pattern data. Derived from the selector 14 is an initial signal for releasing the previously selected pattern data, the initial signal being supplied directly to the unit 10. The bus 12 is coupled also with a bight and feed driver 16, which converts the bight and feed data into bight and feed amounts, respectively, in response to the bight and feed data supplied from the unit 10 by means of the bus 12.

Information to indicate the bight and feed amounts in the driver 16 is supplied to a position detector 18. The detector 18 has a function to convert an analog signal corresponding to the variations of the bight and feed amounts into a digital signal. The A/D-converted digital signal output from the detector 18 is supplied to the unit 10 through the bus 12. Namely, the unit 10, driver 16, and the detector 18, together with the bus 12, form a digital control type servo-loop. Further, the unit 10 is supplied with a timing signal from a timing signal generator 20 in accordance with the vertical position of a sewing needle of the sewing machine. That is, the unit 10 is so designed as to receive one-time timing information with every down-and-up motion of the sewing needle of every sewing cycle. Here the signals used for the sewing operation of the sewing machine are all regarded as sewing control signals.

Figure 6A:
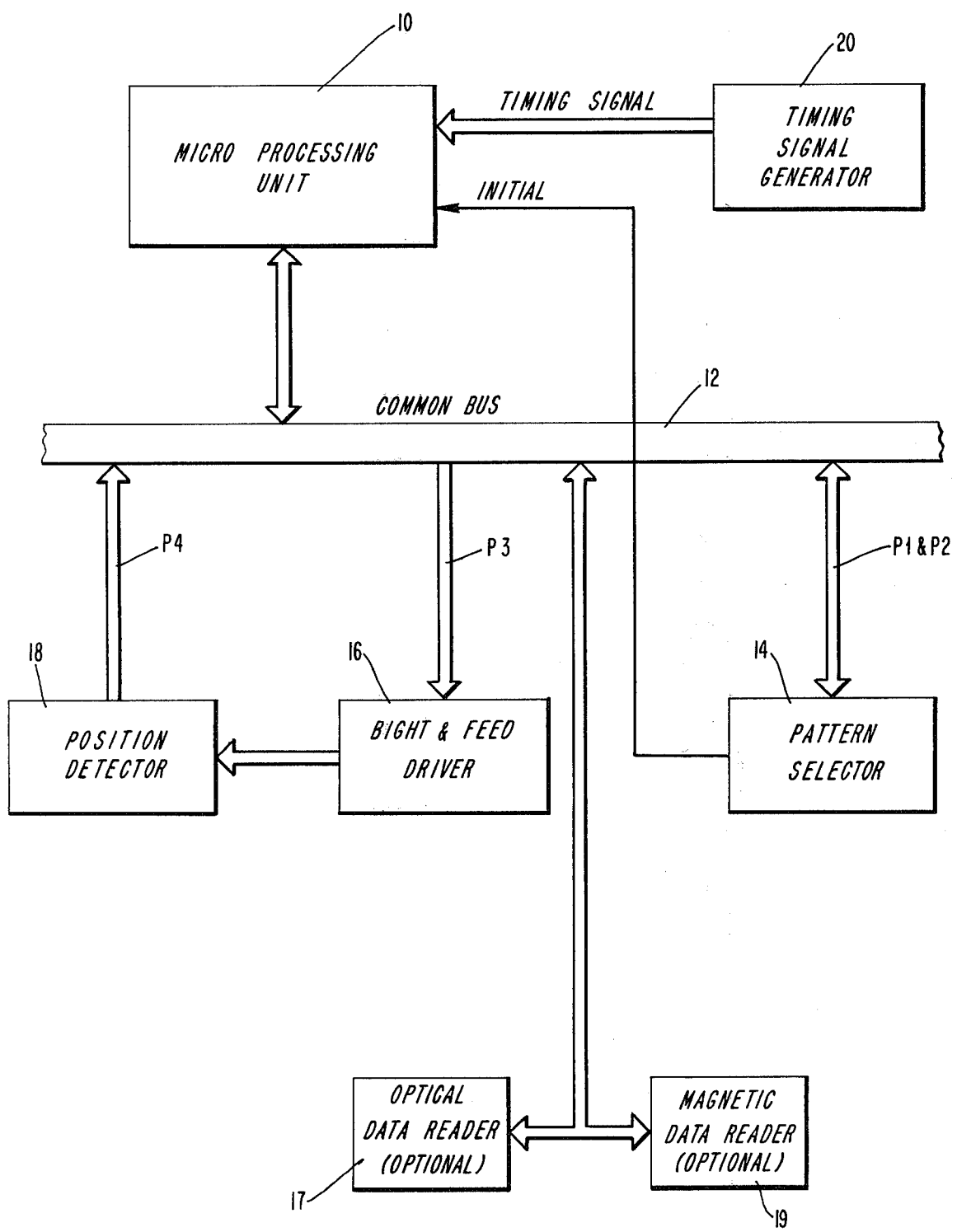
FIG. 6a is a block diagram showing an alternate configuration of the control system for the multiple-pattern sewing machine according to this invention.

FIG. 6a is a block diagram showing an alternate configuration of the control system of the multiple-pattern sewing machine. This configuration differs from that of FIG. 6 only in the provision of means for entering the pattern data selection program into the ROM/RAM, the bight and feed data forming program, the pattern data, and bight and feed operands corresponding to the basic vectors. The entering means, as herein embodied, comprises either an optical data reader 17 such as a card reader or a magnetic data reader 19 such as a magnetic cassette reader. Only one of the readers 17 and 19 need to be coupled to the common bus 12 to introduce the externally-supplied programs or data into the sewing control system.

Figure 7:
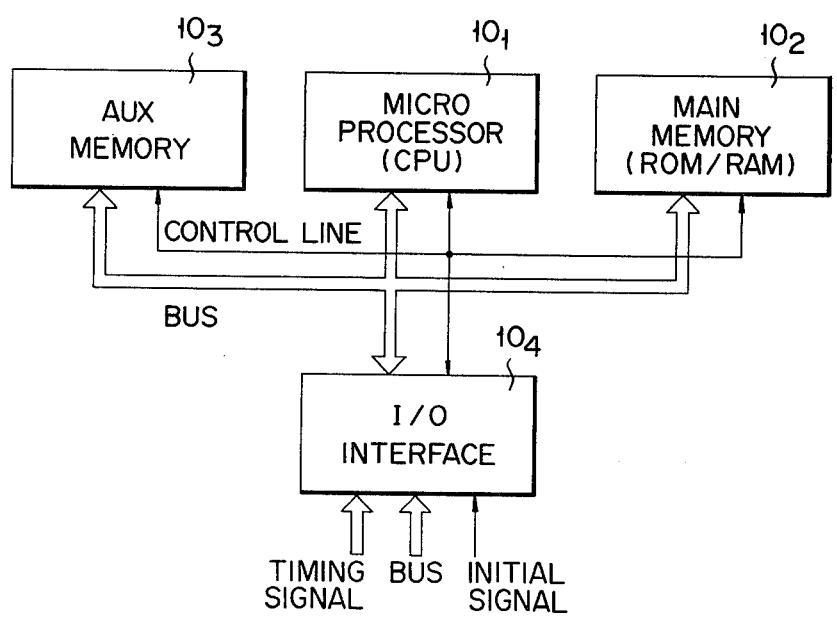
FIG. 7 is an example of a block diagram illustrating the further detailed configuration of the microprocessing unit as shown in FIG. 6.

FIG. 7 is a block diagram showing further definite configuration of the microprocessing unit 10. As may be seen from the drawing of FIG. 7, a microprocessor $10_1$ is deemed different from a main memory $10_2$ herein.

FIG. 8 is a block diagram showing further definite configuration of the timing signal generator 20, in which a photo-interrupter $20_2$ is so disposed as to face both sides of a notched disk $20_1$ rotating in response to the down-and-up motion of the sewing needle. The disk $20_1$ rotates so as intermittently to block the optical path of the interrupter $20_2$, and a phototransistor in the interrupter $20_2$ may perceive light from a light emission diode when the notch of the disk $20_1$ comes into the optical path. When the interrupter $20_2$ has perceived the notch of the disk $20_1$, the phototransistor supplies a timing pulse to a timing logic $20_3$. The logic $20_3$ alternately supplies feed and bight servo signals as the timing signal to the microprocessing unit 10 for renewed feed and bight servocontrol with every supply of a timing pulse.

Figure 9F:
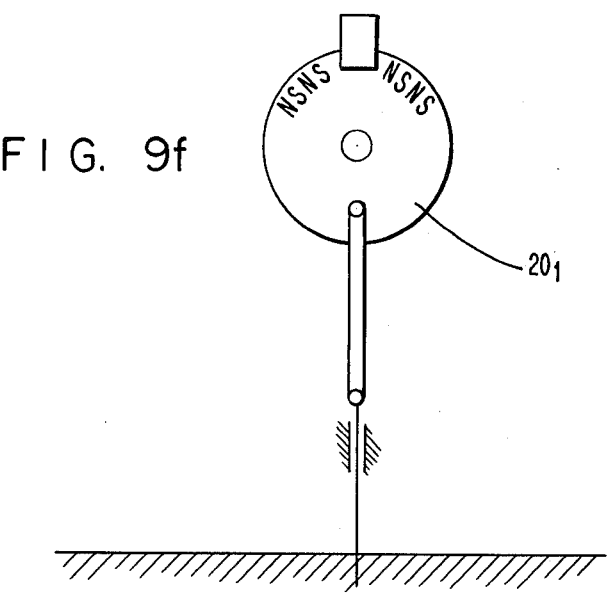

FIGS. 9A to 9E illustrate the mechanical relation between the vertical position of a sewing needle or bit tool of the sewing machine and the timing signal generator 20 at ¼ cycle intervals. FIG. 9A shows a position of the sewing machine in which the bit tool 22 most deeply bites into a piece of cloth 24, that is, the bit tool 22 is in its lowest position. At this point of time, the disk $20_1$ is crossing the optical path of the interrupter $20_2$, causing no timing pulses to be produced. When the disk $20_1$ rotates clockwise, the bit tool 22 coupled with the disk $20_1$ by means of a link mechanism rises. When the disk $20_1$ makes nearly ⅛ turn, the tip end of the bit tool 22 leaves the surface of the cloth 24, and at the same time the starting point A of the notch portion of the disk $20_1$ appears in the optical path of the interrupter $20_2$ (this position is not shown). Then, the timing pulses are produced, and continue to be produced until the optical path of the interrupter $20_2$ is blocked again. That is, when the ending point B of the notch portion appears in the optical path of the interrupter $20_2$, as shown in FIG. 9D, the timing pulses cease. While the mechanical relation between the timing signal generator 20 and the bit tool 22 is as shown in these drawings, it should be noticed that the center of the down-and-up motion of the bit tool 22 is deviated from the surface level of the cloth 24.

Figure 8A:
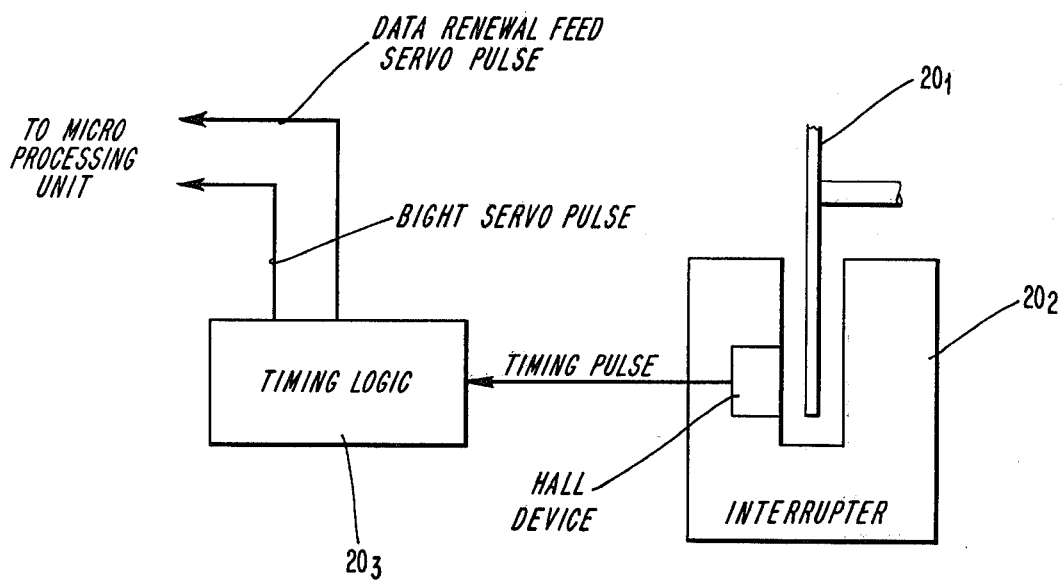
FIG. 8a is a block diagram showing an alternate configuration of the timing signal generator as shown in FIG. 6.

FIG. 8a is a block diagram showing an alternate configuration of the timing signal generator 20. This configuration differs from that of FIG. 8 only in the structure of the disk $20_1$ and interrupter $20_2$. Instead of the optical system as used in the configuration of FIG. 8, the configuration of FIG. 8a employs a magnetic sensor. The interrupter includes a magnetic flux sensing device, for example a Hall effect device, for generating the timing pulses supplied to timing logic $20_3$. Disk $20_1$ includes magnetic flux producing material as indicated by the north and south polarities, N and S, shown in FIG. 9F.

In the same manner that the notched portion of the disk $20_1$ (shown in FIGS. 8 and 9A–9E) generates timing pulses corresponding to the changing position of the bit tool or needle, the magnetic flux-producing material cooperates with the magnetic flux-sensing device, e.g., a Hall effect device, to generate timing pulses by causing magnetic-flux changes in the flux-sensing device.

FIG. 10 shows an envelope of the tip end of the bit tool 22 as shown in FIGS. 9A to 9E. FIGS. 11 to 15 show how the multiple-pattern sewing machine according to the invention operates where the mechanical relation between the bit tool 22 and the timing signal generator 20 is as shown in FIGS. 8 to 10. That is, the moment the bit tool 22 leaves the cloth surface the timing pulses start being produced. At this point of time, bight servocontrol and bight execution that have so far been conducted are discontinued, when another cycle for the next stitch is entered. That is, data formation for another stitch to be subsequently formed is started in response to the rise of the timing pulse. Feed servocontrol is started immediately when such data formation is finished. Feed execution is achieved in accordance with such feed servocontrol. When the timing pulses disappear while the bit tool 22 is still kept away from the cloth 24, the feed servocontrol and feed execution are interrupted, and at the same time bight servocontrol is started (see FIGS. 9D and 15). Namely, bight execution is achieved in accordance with the bight servocontrol which the bit tool 22 is still kept away from the cloth 24. Thus, a mechanical action equivalent to the feed and bight amounts for the stitch to be subsequently formed is completed while the bit tool 22 is removed from the cloth 24. When the mechanical action corresponding to such predetermined feed and bight amounts is finished, the bit tool 22 bites into the cloth 24 for a prescribed stitching operation.

The timings for the rise and fall of the timing pulses may freely be set by adjusting the positions of the starting and ending points A and B of the notch portion of the disk $20_1$. The essential thing is to set the timing pulse so as to allow the data formation, feed execution and bight execution to be achieved while the bith tool 22 is kept away from the cloth 24. Hereupon, the period of time when the bit tool 22 is kept away from the cloth 24 may be prolonged by shifting the surface of the cloth 24 below the down-and-up motion center of the bit tool 22, providing facility for the reservation of the data formation time.

FIG. 16 is a block diagram showing a definite example of the pattern selector 14 as shown in FIG. 6. A switch matrix $14_1$ is formed of 4 rows as well as of 8 columns, and switches Sij (i=0 to 3, j=0 to 7) corresponding to specified stitch patterns (straight and/or zigzag patterns) are arranged in their intersecting portions of the row lines and column lines. The row and column lines of the matrix $14_1$ are connected with a latch $14_2$ of 4-bit output and a buffer $14_4$ of 8-bit input, respectively. The output terminal of the buffer $14_3$ is connected to the common bus 12 by means of a port P1, while the bus 12 is connected to the input terminal of the latch $14_2$ by means of a port P2. Further, a designation switch $14_4$ for changing stitch patterns is connected directly with the microprocessing unit 10. When the switch $14_4$ is turned on, the aforesaid initial signal is supplied to the unit 10. When one of the switches Sij in the matrix $14_1$ is turned on, a single desired pattern data corresponding to such switch Sij is selected from the pattern data stored in the ROM/RAM in the unit 10 in accordance with the selection program previously set in the ROM/RAM.

FIG. 17 is a block diagram showing definite examples of the bight and feed driver 16 and the position detector 18 as shown in FIG. 6. This section forms an actuator portion for servocontrolling the sewing operation of the sewing machine. The driver 16 is supplied with specified digital codes, i.e. bight and feed data, from the common bus 12 through a port P3. These digital codes are severally converted into AC signals with their corresponding frequency components by means of a buffer $16_1$. The AC signals derived from the buffer $16_1$ are converted into voltages corresponding to their respective frequency components by means of frequency/voltage (f/v) converters $16_2$ and $16_3$, respectively. As for the f/v converters $16_2$ and $16_3$, they may be of a simple construction including a charge pump formed of a capacitor and a resistor and a low-pass filter, for example. The output signals of the converters $16_2$ and $16_3$ are amplified to predetermined levels by amplifiers $16_4$ and $16_5$ respectively. The output signals of the amplifiers $16_4$ and $16_5$ are applied to a linear motor $16_6$ for bight (feed) and a linear motor $16_7$ for feed (bight), respectively. The motors $16_6$ and $16_7$ change the aforesaid bight and feed amounts correspondingly to signal voltages supplied from the amplifiers $16_4$ and $16_5$. Further, the driver 16 is provided with an RS flip-flop $16_8$ for the on-off control of a switch $18_{11}$ as mentioned hereinafter, the flip-flop $16_8$ being controlled by a bight-feed switching signal supplied from the unit 10 through the bus 12.

The position detector 18 has variable resistors $18_1$ and $18_2$ coupled respectively with the motors $16_6$ and $16_7$, for providing voltages corresponding to the mechanical displacement of these motors $16_6$ and $16_7$. Applied to each of the resistors $18_1$ and $18_2$ is a fixed bias voltage Vcc. Voltages set by the resistors $18_1$ and $18_2$ are supplied to the non-inverted input terminals of operational amplifiers $18_5$ and $18_6$ through resistors $18_3$ and $18_4$ for offset balancing, respectively. Resistors $18_7$ and $18_8$ are connected between the inverted input terminals of the amplifiers $18_5$ and $18_6$ and an ground circuit, respectively, while variable resistors $18_9$ and $18_{10}$ for bight and feed position adjustment are connected between the inverted input terminals and the output terminals of the amplifiers $18_5$ and $18_6$, respectively. Resistance circuits consisting of the resistors $18_7$ and $18_9$ and of the resistors $18_8$ and $18_{10}$ form the respective negative feedback loops of the amplifiers $18_5$ and $18_6$. The aforesaid bight and feed position adjustment may be achieved by any other suitable means, such as change of the bias voltage Vcc.

The outputs of the amplifiers $18_5$ and $18_6$ are applied to the input of a buffer amplifier $18_{12}$ through the aforesaid analog signal switch $18_{11}$. Two gate transistors forming the switch $18_{11}$ are alternately turned on and off by means of the flip-flop $16_8$. That is, the amplifier $18_{12}$ is allowed to be connected only with either the amplifier $18_5$ or $18_6$, the state of connection being designated by the flip-flop $16_8$. The amplifier $18_{12}$ is formed of an operational amplifier subjected to 100% negative feedback, and its output is supplied to the analog input terminal of an analog-to-digital (A/D) converter $18_{13}$. The converter $18_{13}$ used may be of a successive comparison type, for example, which is supplied with pulses from a clock generator $18_{14}$ for A/D conversion. The digital signal outputted from the converter $18_{13}$ is supplied to a buffer $18_{15}$ for temporary storage, the output of which is delivered to the unit 10 through the bus 12.

FIG. 18 shows the process of the digital servocontrol in accordance with the configuration of FIG. 17. When the analog input signal of the A/D converter $18_{13}$ corresponding to the bight (feed) amount is below an object level predetermined by the stitch data, the microprocessing unit 10 supplies servocontrol pulses to the bight (feed) driver 16. Then, the output of the charge pump forming the f/v converter $16_2$ ($16_3$) is augmented, and the bight (feed) amount increases. When the bight (feed) amount exceeds the object level, the servocontrol pulses may not be produced, so that the output of the charge pump is lowered and the bight (feed) amount is reduced. In this embodiment, the A/D converter $18_{13}$ in the servoloop is used in a free-running condition, because use of the command status method for the data transmission between the converter $18_{13}$ and the unit 10 will require an increased number of steps in the program for servocontrol, retarding the operation of the servo loop. The command status method may, however, be used if there is no problem with respect to the operating speed of the servoloop and high-accuracy servocontrol is needed.

FIGS. 19 and 22 illustrate stitch data formats for the straight pattern formation used with the multiple-pattern sewing machine according to the invention. FIG. 19 shows the case of a fixed length data format in 8 bits (1 byte). In this data format, the 0th to 3rd bits form a 4-bit digital code to indicate a symbol S or basic vector, the 4th to 6th bits form a 3-bit digital code to indicate a stitching frequency n1 (multiplication number) of the basic vector, and the 7th bit forms a 1-bit digital code to indicate A/S (addition/subtraction) for designating whether the basic vector is added to or subtracted from the preceding stitch data. That is, the basic vector is added to the preceding stitch data n1 times when the sign A/S is "0", while it is subtracted from the preceding stitch data n1 times when the sign A/S is "1".

FIG. 20 shows the case of a variable length data format in 2 bytes. In the first byte of this data format, the 0th to 3rd bits form a 4-bit digital code to indicate the symbol S, the 4th to 6th bits are always "0", and the 7th bit forms a 1-bit digital code to indicate A/S. The 4th to 6th bits of the first byte are used for deciding whether the data format is of a fixed or variable length type. If the data format is of the fixed length type, the 4th to 6th bits of the first byte will not be "0". On the other hand, in the second byte, the 0th to 2nd bits form a 3-bit digital code to indicate a stitch length SL, the 3rd to 6th bits form a 4-bit digital code to indicate a stitching frequency n2 (multiplication number), and the 7th bit forms a 1-bit digital code to indicate M/D (multiplication/division) for designating the real length of one stitch. That is, if the sign M/D is "0", the real length of one stitch may be given as a product obtained by multiplying the length of the basic vector designated by the symbol S by the stitch length SL. Here the length L of the basic vector is a scalar given by $L=\sqrt{FO^2+BO^2}$ where the feed and bight operands of the basic vector are FO and BO, respectively. If the sign M/D is "1", however, the real length of one stitch may be represented by the stitch length SL itself. Basically, the aforementioned variable length data format is used where the one-stitch length is made longer than the length of the basic vector.

In FIG. 21, the symbol S among the fixed length data is indicated by the 0th to 2nd bits, the stitching frequency is indicated by the 3rd to 5th bits, and the sign A/S is indicated by the 7th bit. Further provided for the data format of FIG. 21 is a 1-bit digital code in the 6th bit to indicate N/EX (normal/exchange). Here the data corresponding to the feed operand FO and the bight operand BO are given as a feed data FD and a bight data BD, respectively. Then, if both the signs A/S and N/EX are "0", the feed and bight data FD and BD are added to the feed and bight data of the preceding stitch n1 times, respectively. If the sign A/S is "0" and N/EX is "1", however, FD is exchanged for BD, then the positive or negative sign of FD is inverted, and FD and BD are added to the preceding stitch data n1 times. Further, if the sign A/S is "1" and N/EX is "0", FD and BD are subtracted from their corresponding preceding stitch data n1 times. Moreover, if both the signs A/S and N/EX are "1", FD is exchanged for BD, then the positive or negative sign of FD is inverted, and FD and BD are subtracted from the preceding stitch data n1 times. (Equivalent effect may be obtained by inverting the sign of BD, instead of inverting the sign of FD, and adding BD and FD to the preceding stitch data n1 times).

FIG. 22 shows a case in which a bit for the sign N/EX is added to the variable length data format as shown in FIG. 20, pattern data for the formation of various straight patterns may be obtained by combining varied stitch data in accordance with the fixed and/or variable length data formats.

The basic vector may be expressed by means of a vector with the coordinate origin as its starting point in a rectangular coordinate system with the feed amount as the axis of abscissa on a two-dimensional plane and the bight amount as the axis of ordinate. That is, the basic vector may be expressed by means of polar coordinates with origin at the coordinate origin. Accordingly, the several basic vectors radially formed around the coordinate origin may be expressed in terms of the lengths of the vectors and the angles formed between the individual vectors and the corrdinate axis. The basic vectors may, however, be indicated also by the data for the rectangular coordinate axis, that is, feed and bight data. The basic vectors are to be hereinafter expressed by means of the feed and bight data.

All the data required for the formation of a long straight pattern by several stitches may be the vector data for one stitch forming the straight pattern and the stitching frequency data. With these data alone, however, there will be further required data for forming the vector data with every change of the stitching direction (e.g., bight and feed data each in 5 bits). Therefore, the invention with only such data may not be expected to provide substantial reduction in the number of stitch data as compared with the prior art multiple-pattern sewing machine. Hereupon, in the case when the bight and feed data are each corresponding to 5 bits, let the vector data be standardized into 32 basic vectors which divide the whole circumference of the coordinate origin into 32 parts.

Figure 23:
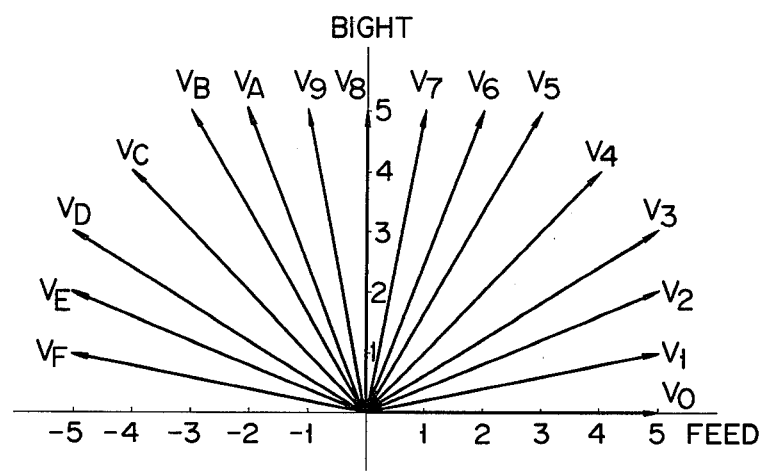
FIG. 23 shows 16 out of 32 basic vectors designated by the straight stitch data as shown in FIGS. 19 and 20.
Figure 24:
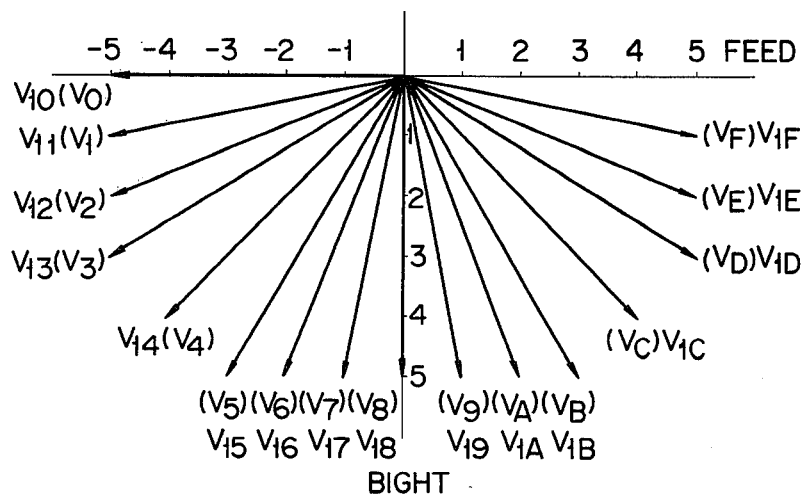
FIG. 24 shows another 16 basic vectors designated by the straight stitch data as shown in FIGS. 19 and 20 and composed from the basic vectors as shown in FIG. 23.

As shown in FIGS. 23 and 24, for example, vectors $V_0$ to $V_{1F}$ with the real length of nearly 5 units are provided as the basic vectors by dividing the circumference of the coordinate origin into 32 substantially equal parts. In order to express these 32 basic vectors, there are required 5-bit data because $32=2^5$. However, microprocessors used for sewing control generally handle 4-bit or 4m-bit (m=1, 2, 3, ...) data, so that 5-bit data are hard to handle. Then, it is advisable to provide only 16 basic vectors $V_0$ to $V_F$ in the first and second quadrants of rectangular coordinates formed of the feed and bight axis, as shown in FIG. 23, composing the basic vectors $V_{10}$ to $V_{1F}$ as shown in FIG. 24 from the basic vectors $V_0$ to $V_F$. That is, when the sign A/S out of the data as shown in FIGS. 19 and 20 is "0", the basic vectors $V_0$ to $V_F$ are used as they are. On the other hand, when the sign A/S is "1", there are used the basic vectors $V_{10}$ to $V_{1F}$ in the third and fourth quadrants obtained by inverting the positive/negative signs of the respective bight and feed data of the basic vectors $V_0$ to $V_F$, as shown in FIG. 24. Namely, subtraction of the basic vectors $V_0$ to $V_F$ from the preceding stitch data is equivalent to addition of the basic vectors $V_{10}$ to $V_{1F}$ to the preceding stitch data, with the sign A/S at "1". Thus, the basic vectors to be provided may be 16 in number, so that they can be expressed by means of 4-bit data.

Figure 26:
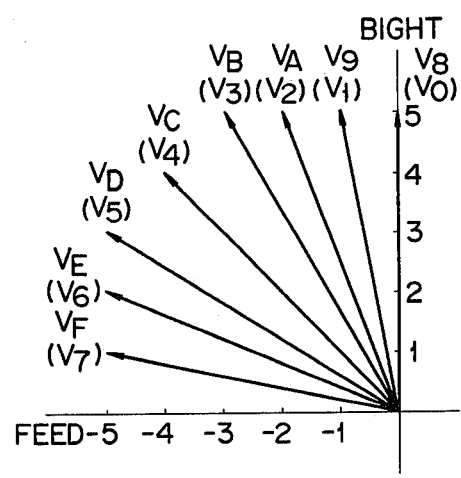
FIGS. 26 to 28 show the remaining 24 basic vectors designated by the straight stitch data as shown in FIGS. 21 and 22 and composed from the basic vectors as shown in FIG. 25.
Figure 27:
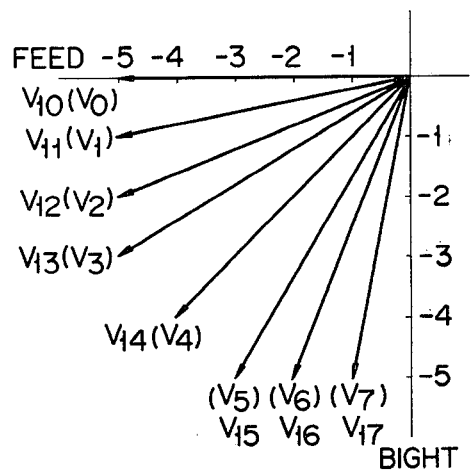
Figure 28:
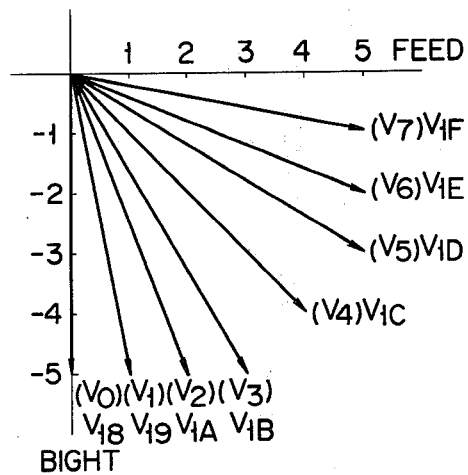

Further, the number of the basic vectors may be reduced to 8 by combining the sign N/EX with the sign A/S, as shown in FIGS. 21 and 22. That is, when both the signs A/S and N/EX are "0", 8 basic vectors $V_0$ to $V_7$ in the first quadrant are used. When the sign A/S is "0" and N/EX is "1", however, the feed data is exchanged for the bight data in the first quadrant, as described in connection with FIG. 21, the sign of the feed data is inverted, and 8 vectors $V_8$ to $V_F$ are obtained in the second quadrant, as shown in FIG. 26. If the signs A/S and N/EX are "1" and "0" respectively, the respective signs of the feed and bight data in the first quadrant are inverted, and 8 vectors $V_{10}$ to $V_{17}$ are obtained in the third quadrant, as shown in FIG. 27. Moreover, if both the signs A/S and N/EX are "1", the feed data is exchanged for the bight data in the first quadrant, the sign of the bight data is inverted, and 8 vectors $V_{18}$ to $V_{1F}$ are obtained in the fourth quadrant, as shown in FIG. 28.

Figure 29:
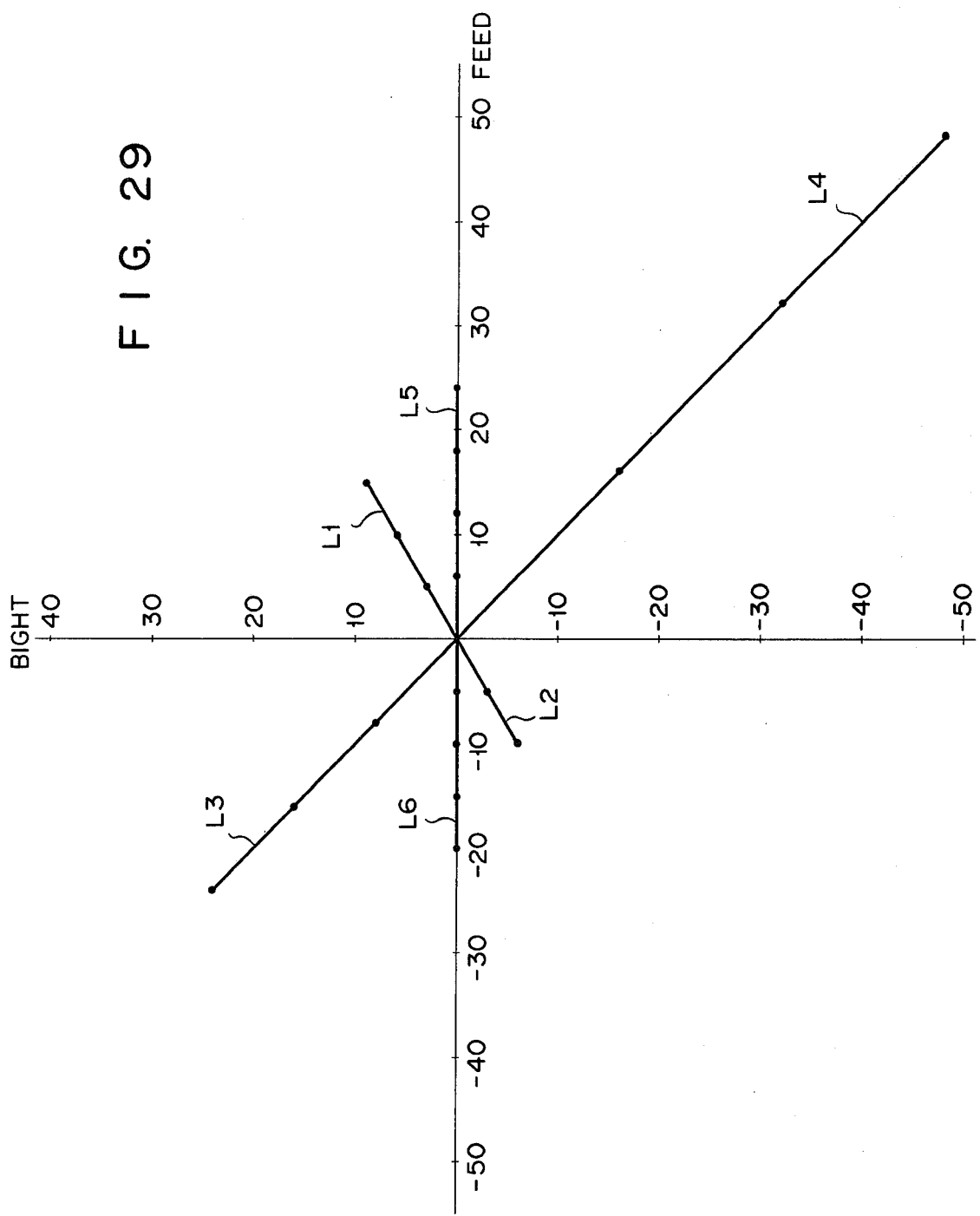
FIG. 29 shows examples of the straight stitch formed by using basic vectors corresponding to the symbol S as shown in Table 2 and the stitch data formats as shown in FIGS. 19 to 22.

The feed operand, bight operand, stitch length, angle from the basic vector $V_0$, and angle difference between adjacent vectors of each of the basic vectors $V_0$ to $V_{1F}$ may be such as shown in Table 2. Referring to Table 2, a data expressed as "33" in the fixed length data format ("00110011" in binary code), for example, means to repeat stitching corresponding to the basic vector $V_3$ indicated by symbol "3" (feed operand = 5, bight operand = 3) 3 times. That is, actual stitch formation by using the stitch data "33" will provide such stitches (seams) as indicated by $L_1$ in FIG. 29. Likewise, stitch formation by means of the stitch data "A3" in the fixed length data format (1010 0011) will produce such stitches as indicated by $L_2$ in FIG. 29. Further, stitch formation by means of the stitch data "0C, 1A" (0000 1100, 0001 1010) and "8C, 1C" (1000 1100, 0001 1100) in the variable length data format will provide stitches as indicated by $L_3$ and $L_4$ in FIG. 29, respectively. While use of the stitch data "00, A6" (0000 0000, 1010 0110) and "80, A5" (1000 0000, 1010 0101) will lead to stitches as indicated by $L_5$ and $L_6$ in FIG. 29 respectively. Although the starting points of the stitches $L_1$ to $L_6$ of FIG. 29 are all at the coordinate origin for ease of understanding, the starting points of actual stitches may vary with the preceding stitch data.

TABLE 2

| Symbol S | Feed Operand (Unit Length) | Bight Operand (Unit Length) | Stitch Length (Unit Length) | Angle (Deg.) | Angle Difference (Deg.) |
|---|---|---|---|---|---|
| 0 | 5 | 0 | 5.0 | 0 | |
| | | | | | 11.3 |
| 1 | 5 | 1 | 5.1 | 11.3 | |
| | | | | | 10.5 |
| 2 | 5 | 2 | 5.4 | 21.8 | |
| | | | | | 9.2 |
| 3 | 5 | 3 | 5.8 | 31.0 | |
| | | | | | 14.0 |
| 4 | 4 | 4 | 5.7 | 45.0 | |
| | | | | | 14.0 |
| 5 | 3 | 5 | 5.8 | 59.0 | |
| | | | | | 9.2 |
| 6 | 2 | 5 | 5.4 | 68.2 | |
| | | | | | 10.5 |
| 7 | 1 | 5 | 5.1 | 78.7 | |
| | | | | | 11.3 |
| 8 | 0 | 5 | 5.0 | 90.0 | |
| | | | | | 11.3 |
| 9 | −1 | 5 | 5.1 | 101.3 | |
| | | | | | 10.5 |
| A | −2 | 5 | 5.4 | 111.8 | |
| | | | | | 9.2 |
| B | −3 | 5 | 5.8 | 121.0 | |
| | | | | | 14.0 |
| C | −4 | 4 | 5.7 | 135.0 | |
| | | | | | 14.0 |
| D | −5 | 3 | 5.8 | 149.0 | |
| | | | | | 9.2 |
| E | −5 | 2 | 5.4 | 158.2 | |
| | | | | | 10.5 |
| F | −5 | 1 | 5.1 | 168.7 | |

According to the data formats as shown in FIGS. 21 and 22, the stitches $L_1$ to $L_6$ may be given as follows:
$L_1$ = "1B" (0001 1011)
$L_2$ = "D3" (1101 0011)
$L_3$ = "44, 1A" (0100 0100, 0001 1010)
$L_4$ = "84, 1C" (1000 0100, 0001 1100)
$L_5$ = "0,0 A6" (0000 0000, 1010 0110)
$L_6$ = "C0, A5" (1100 0000, 1010 0101)

Figures 30, 31:
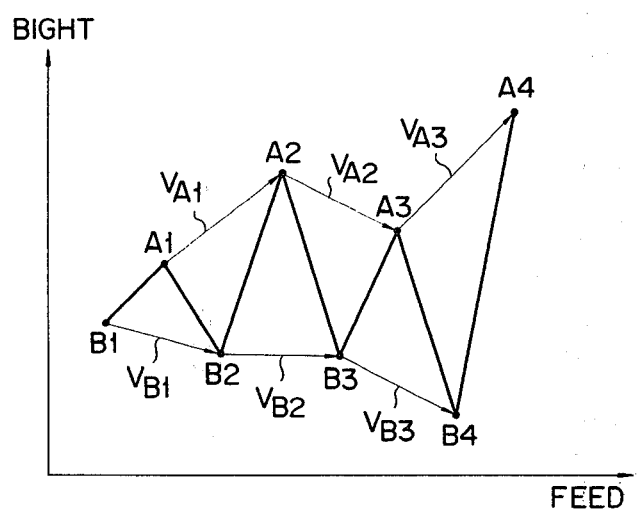
FIG. 30 illustrates a stitch data format for forming zigzag patterns, provided for the multiple-pattern sewing machine according to the invention.
FIG. 31 shows example of the zigzag stitch formed by using the stitch data formats as shown in FIG. 30.
Figure 32:
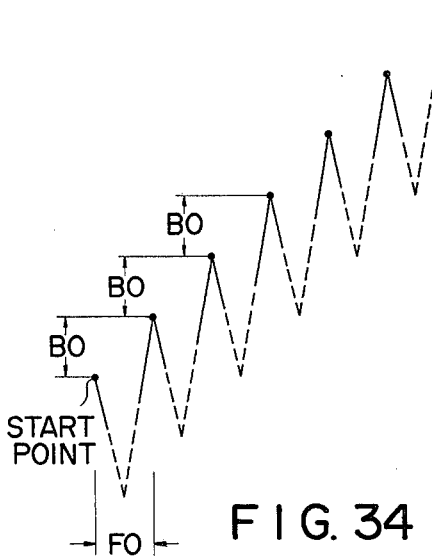
FIGS. 32 and 33 illustrate a series of upper bent points of monotonic-addition-type and monotonic-subtraction-type zigzag stitches formed by using the stitch data format as shown in FIG. 30, respectively.
Figure 33:
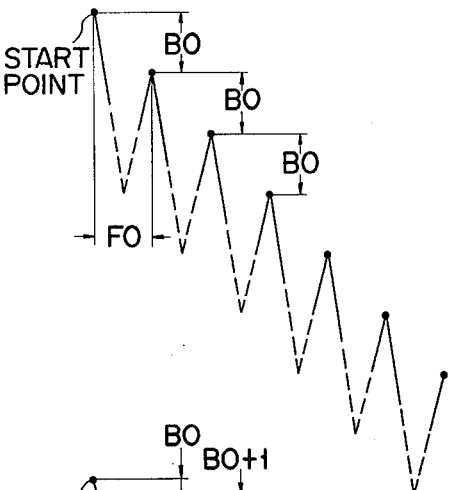
Figure 34:
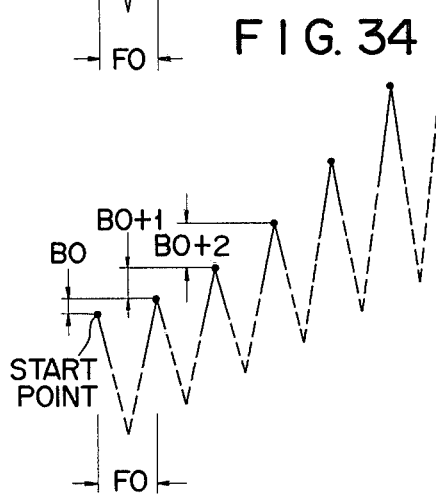
FIGS. 34 and 35 illustrate a series of upper bent points of increasing-addition-type; and increasing-subtraction-type zigzag stitches formed by using the stitch data format as shown in FIG. 30, respectively.
Figure 35:
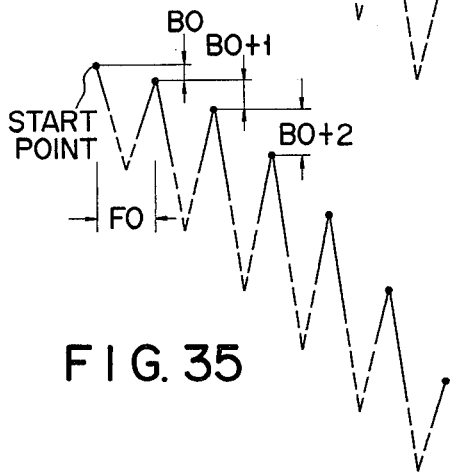
Figure 36:
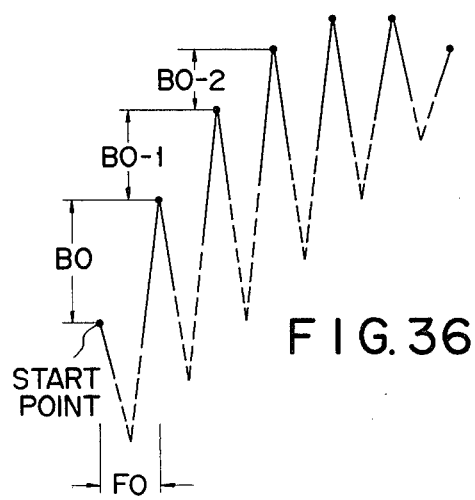
FIGS. 36 and 37 illustrate a series of upper bent points of decreasing-addition-type and decreasing-subtraction-type zigzag stitches formed by using the stitch data format as shown in FIG. 30, respectively.
Figure 37:
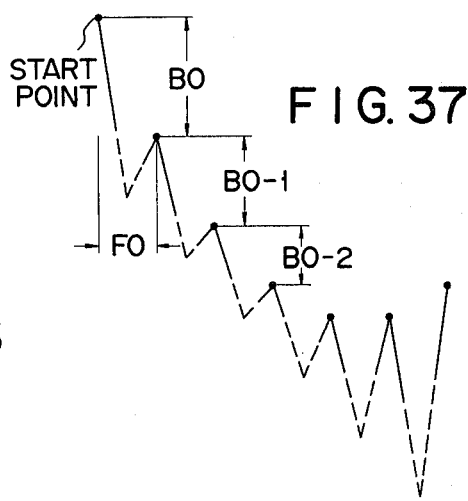

FIG. 30 illustrates a stitch data format for the aforesaid zigzag pattern formation. The stitch data used for the zigzag pattern formation includes 2 bytes for 1 word, the word configuration of which is as follows. That is, the 0th to 4th bits of the first byte form a 5-bit digital code to indicate the bight operand, the 5th bit forms a 1-bit digital code to indicate A/S, the 6th bit forms a 1-bit digital code to indicate I/D (increment/decrement), and the 7th bit forms a 1-bit digital code to indicate N/ID (normal/increment or decrement). Moreover, the 0th to 4th bits of the second byte form a 5-bit digital code to indicate the feed operand, and the 5th to 7th bits form a 3-bit digital code to indicate a stitching frequency n. The signs N/ID, I/D and A/S are used for specifying how the 5-bit bight data of the first byte is to be processed with every cycle of stitching within the stitching frequency n. The relationship between these signs is as shown in Table 3.

The data arrangements of FIGS. 19 to 22 and 30 are subjected to various changes.

TABLE 3

| N/ID | I/D | A/S | |
|---|---|---|---|
| 0 | 0 | 0 | monotonic addition |
| 0 | 0 | 1 | monotonic subtraction |
| 1 | 0 | 0 | incremental addition |
| 1 | 0 | 1 | incremental subtraction |
| 1 | 1 | 0 | decremental addition |
| 1 | 1 | 1 | decremental subtraction |

Namely, the sign N/ID may decide whether the bight operand is to be added entire to (or subtracted from) the proceding data (N/ID = 0) or whether the bight data increased (or decreased) by one with every preparation of data is to be added to (or subtracted from) the preceding bight data (N/ID=1). When the increasing or decreasing operation is designated by the sign N/ID, that is, N/ID=1, the sign I/D may decide whether the bight operand is increased (I/D=0) or decreased (I/D=1) by one with every preparation of data. Further, the sign A/S may decide whether the bight operand is to be added to (A/S=0) or subtracted from (A/S=1) the preceding data. The case where N/ID=1 as in Table 3 is effective for the formation of a curved stitch pattern envelope. In forming a zigzag pattern, the sewing control system alternately provides stitch data for the pattern with every stitch. This data includes limits for the left and right boundaries of the zigzag pattern. Such zigzag operation may be performed by exchanging the program sequence between the upper and lower stitch data in the stitch data forming program for zigzag pattern. Thus, the aforementioned principle of straight pattern may be applied to the data format of a line A or the upper stitches and a line B or the lower stitches, as shown in FIG. 31. That is, the bight and feed amounts of the lines A and B are given by vectors $V_A$ and $V_B$, respectively. Accordingly, the number of stitches obtained from a fixed number of stitch data may be increased as compared with the prior art system. In the zigzag pattern the feed amount for each stitch may usually be fixed, because variable feed amount will lead to uneven width of zigzag stitches, making it hard to obtain beautiful finish. If the feed amount is fixed, it will not be necessary to refer to the 32 basic vectors, unlike the case of the aforesaid straight patterns. Namely, there may be employed the format in which the bight and feed operands are separately designated, as shown in FIG. 30. In this case, there should be required only a stitch data forming program chiefly regarding the preparation of the bight data.

FIGS. 32 to 37 illustrate zigzag patterns formed in accordance with the stitch data for zigzag pattern as shown in FIG. 30. The zigzag patterns specified by Table 3 descendingly correspond to FIGS. 32 to 37. While only the upper stitch patterns are shown in these drawings, the lower stitch patterns may be illustrated in the same manner. By combining the upper and lower stitch patterns each in 6 types as shown in FIGS. 32 to 37, there may be provided $_6C_2=15$ types of basic zigzag patterns-combinations obtained by selecting 2 from 6 groups. However, highly various stitch patterns may be obtained by suitably combining these zigzag patterns with the aforesaid straight patterns. Such combinations may easily be made by interruption in the pattern data forming program.

Now there will be described the process for forming desired pattern data. Herein considered is use of the micro processing unit 10 for servocontrol of the bight and feed driving mechanisms, as well as for pattern data formation. Therefore, there will be a case in which an 8-bit type processor is employed for the microprocessor (CPU) $10_1$, in view of its high execution speed and ease of 5-bit length data processing. As for the processor $10_1$, however, it may be of any type, provided that it may effectively process 5-bit length data. Moreover, unless the processor $10_1$ is used for the bight and feed servocontrol, it may duly be of a 4-bit type only for the preparation of pattern data. Where the positions of the flag bits as shown in FIGS. 19 to 22 and 30 are handled or 5-bit length data are directly processed, however, consideration should be given as follows. That is, the data format and pattern data forming program need to be changed so that the 5-bit data may be divided into a sign bit plus 4 bits to be indirectly processed on the main program side.

Figure 38:
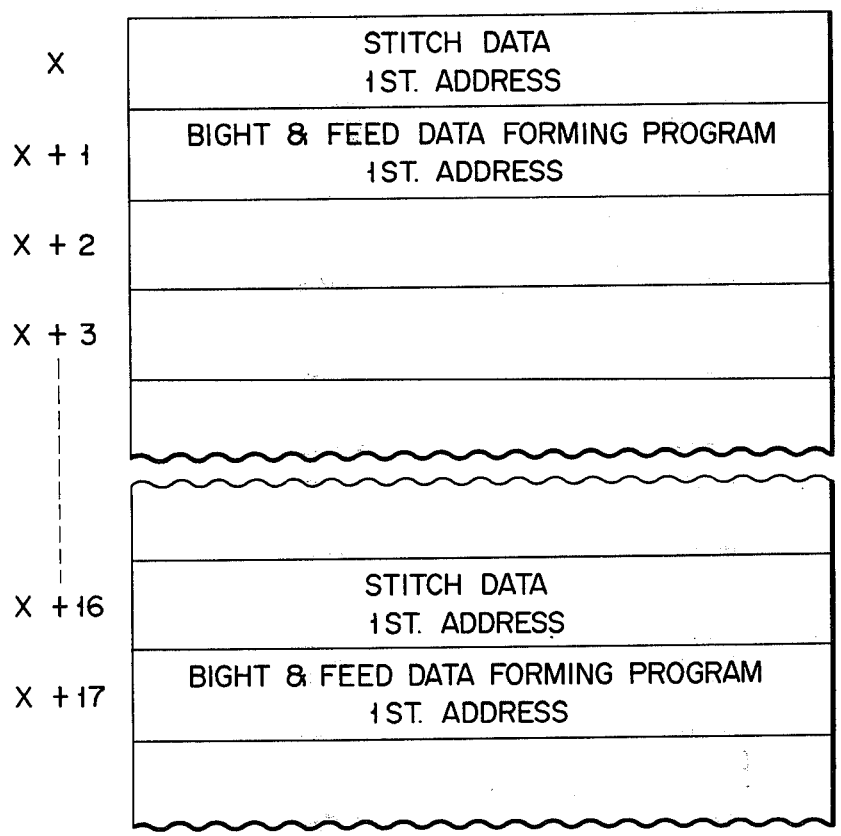
FIG. 38 is a data table illustrating the storage conditions of the first addresses of stitch data as well as of bight and feed data forming programs, previously stored in the microprocessing unit as shown in FIG. 6.

FIG. 38 shows 1st addresses of stitch data (X, X+2, X+4, ...) and 1st addresses of bight and feed data forming program (X+1, X+3, X+5, ...) previously stored in the microprocessing unit 10. In FIG. 38 a first stitch pattern is designated by two addresses X and X+1, while a second stitch pattern is designated by two addresses X+2 and X+3. Likewise, each set of pattern data is designated by each two addresses, and successively stored in the ROM/RAM $10_2$ of the unit 10.

Figure 39:
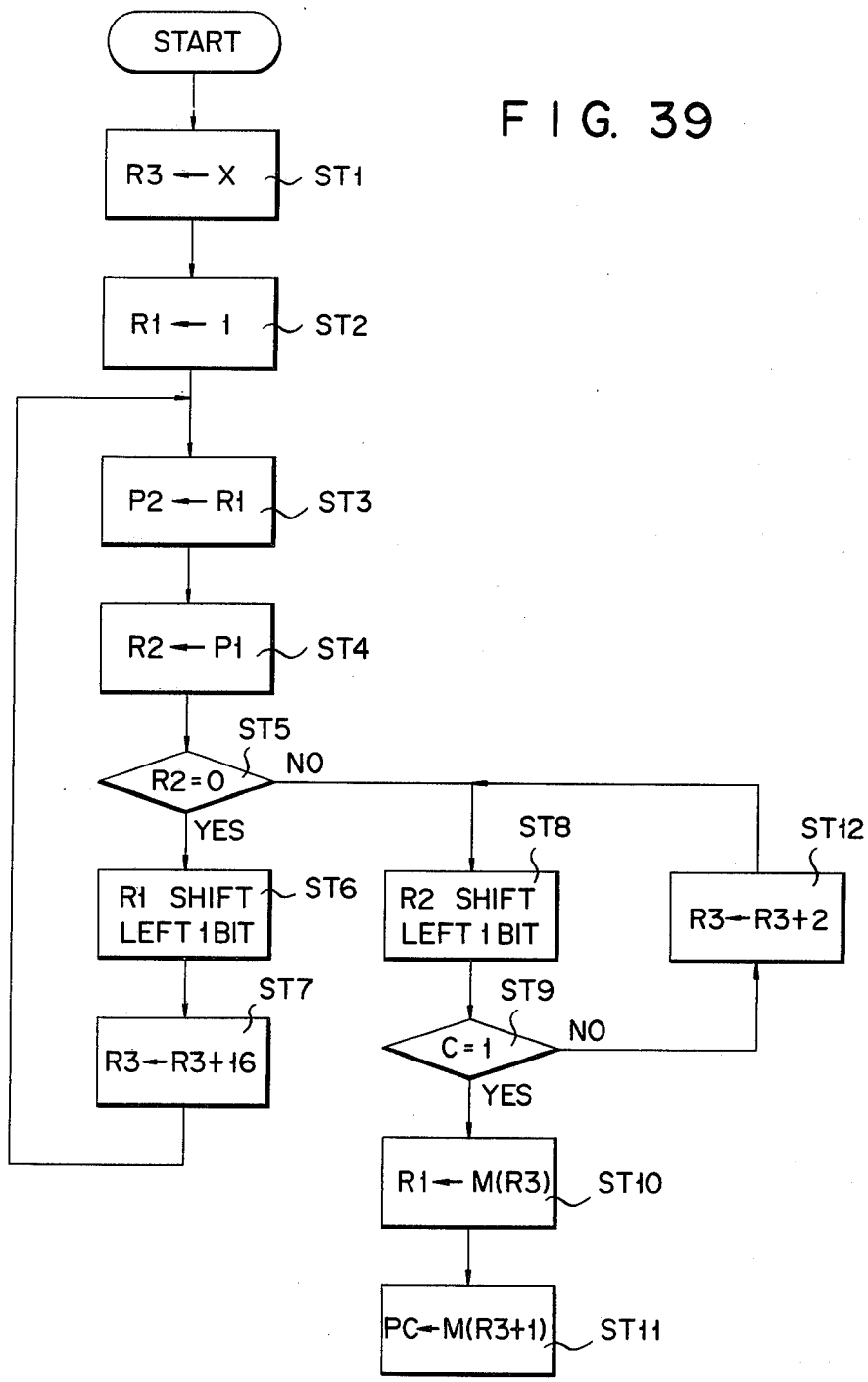
FIG. 39 shows a flow chart of a selection program for selecting a pattern data designated by the pattern selector as shown in FIG. 6 among the stitch data as shown in FIG. 38.

FIG. 39 is a flow chart illustrating a selection program for the selection of the pattern data for the straight and zigzag pattern formation as shown in FIG. 38. Available for explanation are registers R1 to R3 and C and a program counter PC, as well as the pattern selector 14 for designating the stitch pattern as shown in FIG. 16. Referring to FIG. 39, let us suppose that one switch Sij of the switch matrix $14_1$ corresponding to one desired stitch pattern is turned on before starting. When the designation switch $14_4$ for changing stitch patterns is turned on, the initial signal is supplied to the microprocessing unit 10. Then, the unit 10 starts to execute the selection program. First, in Step 1, there is stored in the register R3 the address X to designate the first address of the first stitch data stored in the ROM/RAM $10_2$. Then, in Step 2, a numerical value "1" is stored in the register R1. In Step 3, the content of the register R1 is delivered as a reference signal from the Unit 10 to the port P2. In Step 4, the data in the port P1 derived in Step 3 from the buffer $14_3$ is stored in the register R2. That is, the logical value at the "0" output terminal of the latch $14_2$ becomes "1" in Step 3, and the on-off states of the switches $S_{00}$ to $S_{07}$ on the intersection points of the first row line and the column lines of the matrix $14_1$ are temporarily stored in the buffer $14_3$. Thereafter, in Step 4, the data stored in Step 3 in the buffer $14_3$ are stored in the register R2 through the port P1 and common bus 12.

In Step 5, it is decided whether the numerical content of the register R2 is 0 or not. If R2=0, that is, all the logics of the first row of the matrix $14_1$ are 0, all the switches $S_{00}$ to $S_{07}$ are off. Accordingly, Step 6 is entered for reference to the second row of the matrix $14_1$. In Step 6, the digits in the register R1 are shifted to the left by 1 bit (This practically means that a numerical value "2" is stored in the register R1.). Then, in Step 7, 16 is added to the numerical content of the register R3. That is, 8 pattern data or 16 addresses are skipped, since no switches on the first row line are "on". At this time, the 1st address of stitch data (X+16) or the 1st address of the ninth pattern data is stored in the register R3. When Step 7 is executed, Step 3 is resumed. In Step 3, the digits in the register R1 shifted by 1 bit in Step 6 are delivered to the port P2. Then, in Step 4, the numerical content of the port P1 is stored in the register R2. Namely, the logical value at the "1" output terminal of the latch $14_2$ becomes "1" in Steps 3 and 4, and the on-off states of the switches $S_{10}$ to $S_{17}$ of the second row of the matrix $14_1$ are stored in the register R2. If any of the switches $S_{10}$ to $S_{17}$ is turned on, it is decided in Step 5 that R2≠0, and Step 8 is entered.

In Step 8, the digits in the register R2 are shifted to the left by 1 bit. Then, in Step 9, it is decided whether or not the numerical content of the register C storing the carry-out bit of the register R2 is 1. If C=1, that is, the most significant digit in the register R2 is 1, then Step 10 is entered, and the content of the register R3 or the 1st address of stitch data among the pattern data designated by the switch Sij is stored in the register R1. Further, in Step 11, stored in the program counter PC is an address subsequent to the address designated by the content of the register R3, that is, the 1st address of bight and feed data forming program among the pattern data designated by the switch Sij. If the numerical content of the register C is not 1 in Step 9, Step 12 is entered, 2 is added to the numerical content of the register R3, and Step 8 is resumed. Then, in Step 8, the digits in the register R2 are again shifted to the left by 1 bit, and it is decided in Step 9 whether the current number in the register C is 1 or not. Let it be supposed that the switch $S_{11}$ out of the matrix $14_1$ is on, for example. Then, after the above selection program is executed, the content of the address (X+18) is stored in the register R1, and the content of the address (X+19) is stored in the program counter PC. After execution of the aforesaid selection program, stored in the program counter PC of the microprocessor $10_1$ is the 1st address of bight and feed data forming program for forming the stitch pattern designated by the switch Sij, so that execution of the bight and feed data forming program may be started immediately.

FIG. 40 illustrates the respective stored data of registers R1 to R5, N, A1, A2, C, RF and RB for straight stitching included in the microprocessing unit 10. In FIG. 40, stored in the register R1 is the 1st address of stitch data designated by the switch matrix $14_1$, as described in connection with FIG. 39. Further, stored in the register R2 is a stitch data index address the content of which may be added by 1 with every execution of one stitch. The registers R3 and R4 are to store the feed operand F0 and bight operand B0 of the basic vector corresponding to the designated symbol S, respectively, each having one sign bit and 5-bit operand portion. Stored in the register R5 is a data (n1 or n2) to indicate the stitching frequency n, while stored in the register N is a data to indicate a repetition frequency N of such stitch data. Further, a fixed length stitch data is stored in the register A1, and the second byte of a variable length stitch data is stored in the register A2. That is, the fixed data is stored only in the register A1, while the variable data is stored in both the registers A1 and A2. Then data arrangements for the registers A1 and A2 of FIG. 40 are different from those of FIGS. 19 and 20, which implies that the data arrangements are not limited to those shown in FIGS. 19 and 20. This applies also to FIGS. 21, 22 and 30. The register C is a register for temporarily storing the numerical content of the program counter PC. Further, the registers RF and RB are intended for storing the feed and bight data respectively.

TABLE 4

| Byte | | Stitch Data |
|---|---|---|
| 1st | BD | 00 (0000 0000) |
| 2nd | N | 20 (0010 0000) |
| 3rd | | 30 (0011 0000) |
| 4th | | 2A (0010 1010) |
| 5th | | BF (1011 1111) |
| 6th | | 48 (0100 1000) |
| 7th | | DE (1101 1110) |
| 8th | | D2 (1101 0010) |
| 9th | | 30 (0011 0000) |
| 10th | | 21 (0010 0001) |
| 11th | | 97 (1001 0111) |
| 12th | | 94 (1001 0100) |

TABLE 4-continued

| Byte | Stitch Data |
|---|---|
| 13th | 30 (0011 0000) |

Table 4 shows examples of the stitch data for straight patterns. In Table 4 a stitch data BD in the first byte indicates the initial value of stitch data, while a stitch data N in the second byte indicates the repetition frequency of the stitch data as given by the third and further succeeding bytes.

Figure 41:
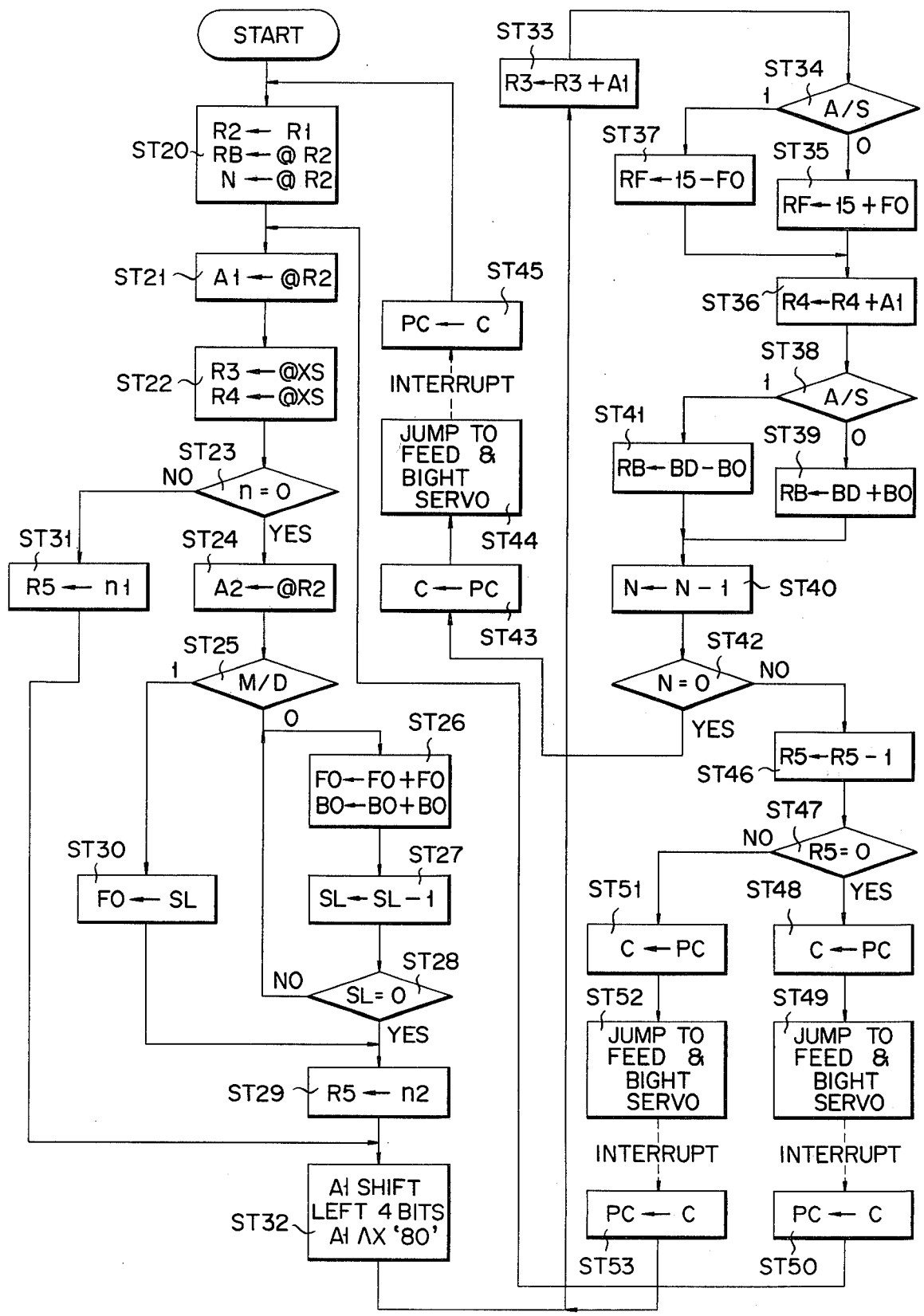
FIG. 41 shows a flow chart of a bight and feed data forming program for the formation of straight patterns.

FIG. 41 is a flow chart illustrating a bight and feed data forming program for straight patterns. In the flow chart, a mark "@" means an indirect address. First, in Step 20, the 1st address of stitch data stored in the register R1 is stored in the register R2, the initial stitch data BD in the first byte of the address designated by the register R2 is stored in the register RB, and the repetition frequency data N in the second byte of the address designated by the register R2 is stored in the register N. In Step 21, the stitch data in the third byte of the address designated by the register R2 are stored in the register A1. In Step 22, the feed and bight operands F0 and B0 corresponding to the basic vector indicated by the symbol S among the data stored in the register A1 are derived from the ROM/RAM $10_2$, and stored in the registers R3 and R4 respectively.

In Step 23, it is decided whether or not the stitching frequency n1 among data stored in the register A1 is 0. If n1=0, it is decided that the stitch data designated by the register R2 is of variable length type, and Step 24 is entered. In Step 24, a stitch data in the fourth byte of the address designated by the register R2 is stored in the register A2. In Step 25, it is decided whether the sign M/D in the register A2 is 1 or 0. If M/D=0, Step 26 is entered. In Step 26, new values of F0 and B0 are obtained by adding F0 and B0 of the basic vector to the current F0 and B0, respectively, and stored in the registers R3 and R4 respectively. Further, in Step 27, 1 is subtracted from the stitch length data SL in the register A2 and, in Step 28, it is decided whether the numerical value of the data SL is 0 or not. If SL≠0, Steps 26 and 27 are repeated until SL=0 is obtained. That is, the operands F0 and B0 stored in the registers R3 and R4 in Steps 26 to 28 are made equal to values multiplied by the numerical value of the data SL. Then, if it is decided in Step 28 that SL=0, Step 29 is entered.

Meanwhile, if it is judged in Step 25 that M/D=1, then Step 30 is entered. In Step 30, the data SL itself is stored as the operand F0 in the register R3, and thereafter Step 29 is entered. In Step 29, the stitching frequency n2 in the register A2 is stored in the register R5, then Step 32 is started. On the other hand, if it is decided in Step 23 that n≠0, the stitch data designated by the register R2 is regarded as of fixed length type, and then Step 31 is entered. In Step 31, the stitching frequency n1 in the register A1 is stored in the register R5, then Step 32 is started. When execution of Step 31 or Step 29 is over, formation of the feed operand F0, bight operand B0 and stitching frequency n of the stitch data, whether of fixed or variable length data format, is completed. These data F0, Bo and n are stored in the registers R3, R4 and R5, respectively.

In Step 32, the digits in the register A1 are shifted to the left by 4 bits, and then a logical sum with data "80" (1000 0000) is performed. Thereupon, the most significant digit (7th bit) of the register A1 becomes 1 or 0 if A/S=1 or 0, respectively. Further, all of the 0th to 6th bits of the register A1 become 0. That is, in Step 32, the contents of the register A1 is converted into a data with a sign at the 7th bit, and then Step 33 is entered. In Step 33, the contents of the register A1 obtained in Step 32 are added to the register R3. Then, the sign A/S is set in the 7th bit of the register R3 or the sign bit to specify the positive-negative property of the operand FO. Moreover, in Step 34, it is decided whether the 7th bit or A/S of the register R3 is 1 or 0. If A/S=0, then Step 35 is entered. In Step 35, stored in the register RF is the feed data FD obtained by adding the operand FO to the median 15 of the 5-bit data or 32 data from 0 to 31, and then comes Step 36. If it is decided in Step 34 that A/S=1, however, Step 37 is entered. In Step 37, a numerical value obtained by subtracting FO from the median 15 of the 5-bit data is stored as the feed data FD in the register RF, and then Step 36 is entered.

In Step 36, the contents of the register A1 obtained in Step 32 are added to the register R4. Then, the sign A/S is set in the sign bit of the register R4. Further, in Step 38, it is decided whether the sign A/S in the register R4 is 1 or 0. If A/S=0, then Step 39 is entered. In Step 39, a new value of BD obtained by adding the bight operand BO in the register R4 to the bight data BD in the register RB is stored in the register RB, and then Step 40 is entered. If it is decided in Step 38 that A/S=1, however, Step 41 is entered. In Step 41, a value obtained by subtracting the operand BO in the register R4 from the data BD in the register RB is stored as a new data BD in the register RB, and thereafter Step 40 is entered. By Step 40, preparation of the data FD and BD is completed, these data being stored in the registers RF and RB respectively. In Step 40, 1 is subtracted from the numerical value in the register N, and then Step 42 is entered. In Step 42, it is decided whether the content of the register N is 0 or not. If N=0, preparation of the stitch pattern data is finished, and then Step 43 is started. In Step 43, the current number in the program counter PC is stored in the register C, which is followed by Step 44. Immediately when the stitch data formation is finished at Step 43, feed servocontrol is started in Step 44, as shown in FIGS. 11 and 12. Immediately after completion of such feed servocontrol, bight servocontrol is commenced. During the feed and bight servocontrol period, the program counter PC continues counting the program steps for the servocontrol. When execution of the bight servocontrol is over and an instruction command for interruption is given, Step 45 is entered. In Step 45, the program count value at Step 43 stored in the register C is again stored in the program counter PC, then Step 20 is resumed, and preparation of the next stitch pattern data is started.

On the other hand, if it is judged in Step 42 that N≠0, then Step 46 is entered. In Step 46, 1 is subtracted from the numerical content of the register R5, which is followed by Step 47. In Step 47, it is decided whether the numerical content of the register R5 is 0 or not. If R5=0, preparation of data for one straight stitch in a stitch pattern is finished, and Step 48 is entered. In Step 48, the current number in the program counter PC is stored in the register C, and Step 49 is entered. In Step 49, feed and bight servocontrol is started in the same manner as in Step 44. When execution of such servocontrol is over and the instruction command for interruption is given, the numerical content of the register C is stored in the program counter PC in Step 50, then Step 21 is resumed, and data preparation for the next straight stitch is commenced. If it is judged in Step 47 that R5≠0, then Step 51 is entered. In Step 51, the current number in the program counter PC is stored in the register C, then Step 52 is entered. Then, in Step 52, feed and bight servocontrol is started. When execution of this servocontrol is over and the instruction command for interruption is given, the numerical content of the register C is stored in the program counter PC, then Step 33 is resumed, and data preparation for the next stitch is commenced.

As may be clear from the flow chart of FIG. 41, straight stitching in the same direction is executed when N≠0 and R5≠0 in Steps 42 and 47. If N≠0 and R5=0, however, formation of separate straight stitches in the same pattern is executed, and one stitch pattern is formed with every reduction of N by 1. Further, when N=0, execution of the repeated formation of the stitch pattern is completed, and then execution for another stitch pattern is started.

FIG. 42 illustrates the respective stored data of registers R1 to R4, A1, A2, B1, B2, N, n, K, C, RF and RB for zigzag stitching included in the microprocessing unit 10. The data storage conditions of the registers R1, R2, N, C, RF and RB of FIG. 42 are the same as those shown in FIG. 40. As regards the registers R3, R4, A1 and A2, however, the data storage conditions as shown in FIG. 42 are different from those shown in FIG. 40. That is, the register R3 stores the bight operand B0 and the signs N/ID, I/D and A/S as given by Table 3, for upper or lower stitch patterns. As for the register R4, it stores the feed data FD and stitching frequency n for upper or lower stitch patterns. Further, the register A1 stores the operand BO and the signs N/ID, I/D and A/S as given by Table 3, for the A-line or the upper stitch pattern. Moreover, the register A2 stores the data FD and stitching frequency n for the A-line. The registers B1 and B2 stores data for the B-line or the lower stitch pattern correspondingly to the registers A1 and A2, respectively. Furthermore, the register n is to store the stitching frequency n for zigzag stitching, while the register K is to store a sign K for discriminating between the A- and B-lines.

TABLE 5

| Word | Stitch Data | |
|------|-------------|---|
| 1st | BD | 00 |
| 2nd | N | 1E |
| 3rd | A$_1$ | 1E34 |
| 4th | B$_1$ | 0E34 |
| 5th | A$_2$ | 22F4 |
| 6th | B$_2$ | 21F4 |
| 7th | A$_3$ | 22F4 |
| 8th | B$_3$ | 21F4 |

Table 5 shows examples of the stitch data for zigzag patterns. In Table 5 the stitch data BD in the 1st word indicates the initial value of the stitch data, while the stitch data N in the 2nd word indicates the repetition frequency of the stitch data in the 3rd and subsequent words.

Figure 43:
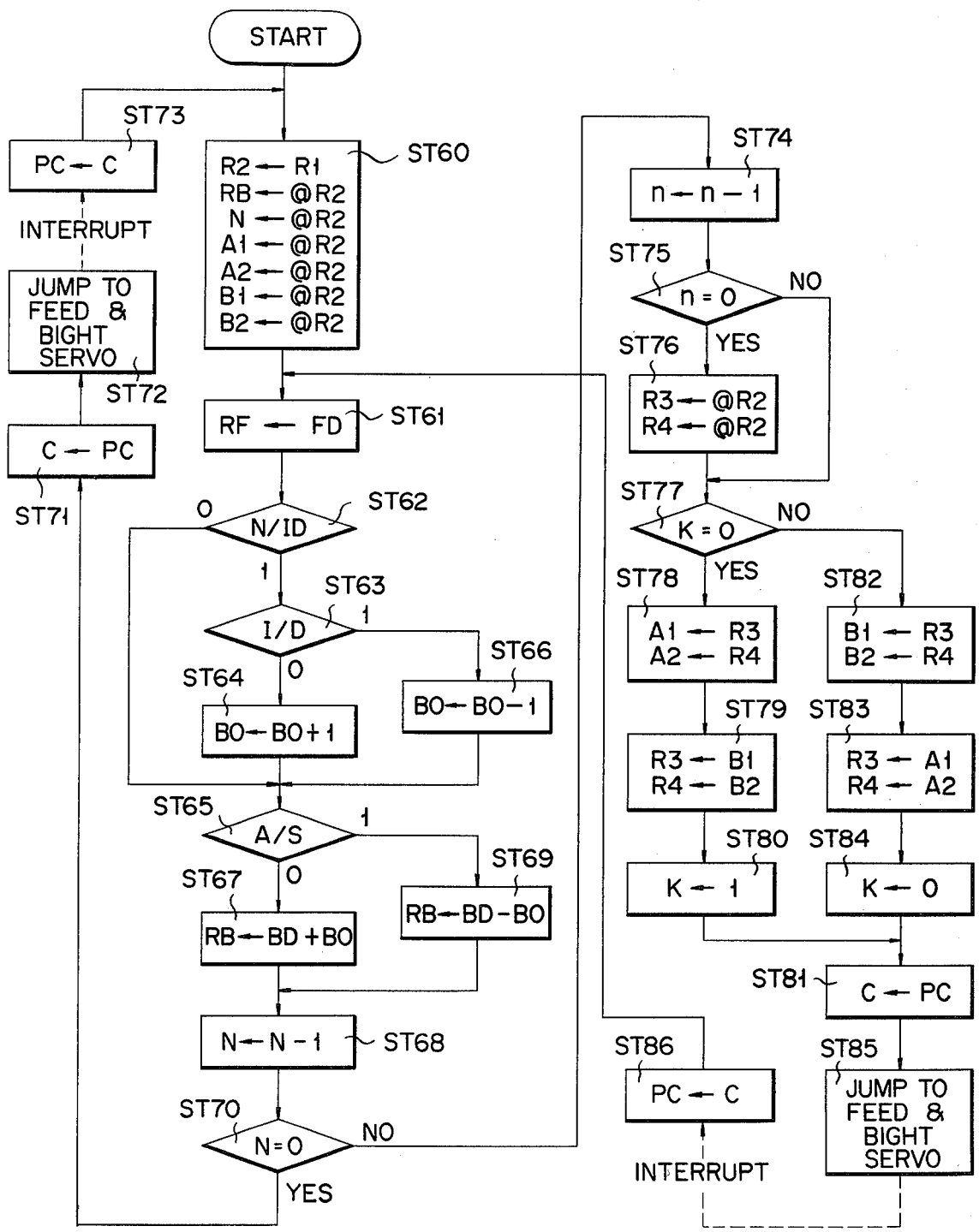
FIG. 43 shows a flow chart of a bight and feed data forming program for the formation of zigzag patterns.

FIG. 43 is a flow chart illustrating a bight and feed data forming program for zigzag patterns. First, in Step 60, the 1st address of stitch data stored in the register R1 is stored in the register R2, the initial stitch data BD in the 1st word of the address designated by the register R2 is stored in the register RB, and the repetition frequency data N in the 2nd word of the address designated by the register R2 is stored in the register N. Further, the first and second bytes in the 3rd word of the address designated by the register R2 are stored in the registers A1 and A2, respectively, while the first and second bytes in the 4th word of the same address are stored in the registers B1 and B2, respectively. In Step 61, the feed data FD in the register A2 or the second byte of the 3rd word is stored in the register RF. Then, in Step 62, it is decided whether the sign N/ID in the register A1 or the first byte of the 3rd word is 1 or 0. If N/ID=1, then Step 63 is entered. In Step 63, it is decided whether the sign I/D is 0 or 1. If I/D=0, then Step 64 is entered. In Step 64, a new value of BO is obtained by adding 1 to the bight operand BO in the register A1, then Step 65 is entered. If it is decided in Step 63 that the sign I/D is 1, however, Step 66 is entered. In Step 66, a new value of BO is obtained by subtracting 1 from the operand BO in the register A1, then Step 65 is entered. Further, if it is found in Step 62 that the sign N/ID is 0, then Step 65 is reached at a bound from Step 62.

In Step 65, it is decided whether the sign A/S in the register A1 is 0 or 1. If A/S=0, then Step 67 is entered. In Step 67, a new value of BD obtained by adding the bight operand BO at Step 65 to the bight data BD in the register RB is stored in the register RB, and thereafter Step 68 is entered. On the other hand, if it is decided in Step 65 that the sign A/S is 1, however, Step 69 is entered. In Step 69, a new value of BD obtained by subtracting the operand BO at Step 65 from the bight data BD in the register RB is stored in the register RB, and then Step 68 is entered. By Step 68, preparation of the data FD and BD is completed, these data being stored in the registers RF and RB respectively. In Step 68, 1 is subtracted from the numerical content of the register N, and Step 70 is entered. In Step 70, it is decided whether the content of the register N is 0 or not. If N=0, then Step 71 is entered. In Step 71, the current number in the program counter PC is stored in the register C, which is followed by Step 72.

When formation of the stitch data for the zigzag pattern is finished by Step 71, bight and feed servocontrol is started at Step 72. When execution of the bight and feed servocontrol is over and an instruction command for interruption is given, Step 73 is entered. In Step 73, the program count value at Step 71 stored in the register C is again stored in the program counter PC, then Step 60 is resumed, and preparation of data for the next stitch pattern is started. On the other hand, if it is judged in Step 70 that N≠0, then Step 74 is entered. In Step 74, 1 is subtracted from the stitching frequency n for zigzag stitching stored in the register n, which is followed by Step 75. In Step 75, it is decided whether the numerical content of the register n is 0 or not. If n=0, then Step 76 is entered. In Step 76, the first and second bytes in the 5th word of the address designated by the register R2 are stored in the registers R3 and R4, respectively, then Step 77 is entered. If it is found in Step 75 that n≠0, then Step 77 is reached at a bound from Step 75.

In Step 77, it is decided whether the sign K stored in the register K is 0 or not. If K=0, that is, if execution of the A-line stitch is finished immediately before the current stitch data formation, then Step 78 is started. In Step 78, the contents of the registers R3 and R4 are transferred to the registers A1 and A2, respectively, then Step 79 is entered. In Step 79, the contents of the registers B1 and B2 are transferred to the registers R3 and R4, respectively, then Step 80 is entered. In Step 80, 1 is stored in the register K, and then Step 81 is entered.

Meanwhile, if it is found in Step 77 that K≠0, that is, execution of the A-line stitch is not finished before the current stitch data formation, then Step 82 is entered. In step 82, the contents of the registers R3 and R4 are transferred to the registers B1 and B2, respectively, then Step 83 is entered. In Step 83, the contents of the registers A1 and A2 are transferred to the registers R3 and R4, respectively, then Step 84 is entered. In Step 84, 0 is stored in the register K, and then Step 81 is entered. In Step 81, the current number of the program counter PC is stored in the register C, and then Step 85 is entered.

When preparation of data for one stitch is finished by Step 81, bight and feed servocontrol is started in Step 85. When execution of the bight and feed servocontrol is over and the instruction command for interruption is given, Step 86 is entered. In Step 86, the program count value at Step 81 stored in the register C is again stored in the program counter PC, then Step 61 is resumed, and preparation of data for the next stitch is started.

As may be clear from the flow chart of FIG. 43, the A-line stitching is executed if K≠0 or K=1 in Step 77, while the B-line stitching is executed if K=0. The zigzag stitching may be achieved because the value of K is changed with every stitch. The zigzag stitch is repeated until n=0 is obtained in Step 75. When the content of the register n becomes 0, the shape of the zigzag stitch is altered, and the zigzag stitching is repeated until n=0 is obtained again. Further, the zigzag pattern formed of these stitches is repeated until N=0 is attained in Step 70.

Figure 44:
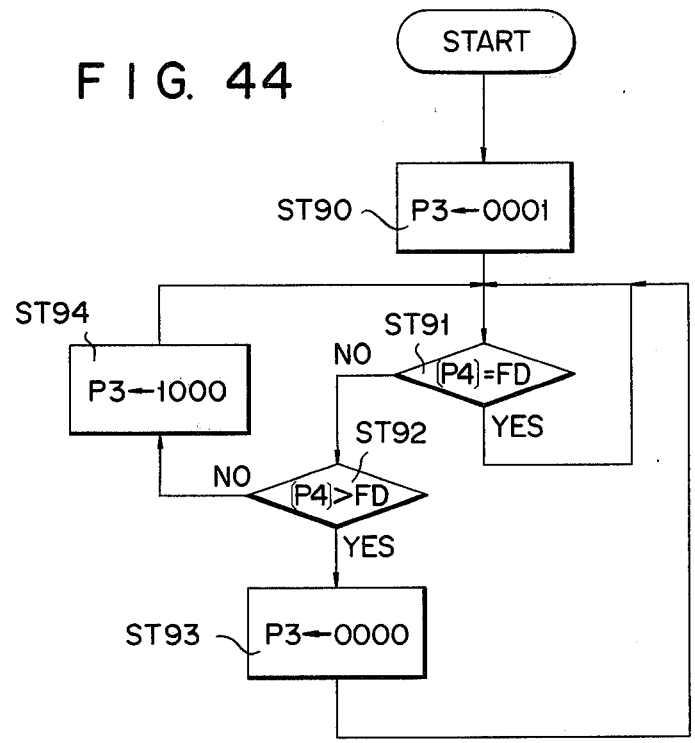
FIG. 44 shows a flow chart of a feed servocontrol program for the feed servocontrol of the multiple-pattern sewing machine by means of the construction as shown in FIG. 17.
Figure 45:
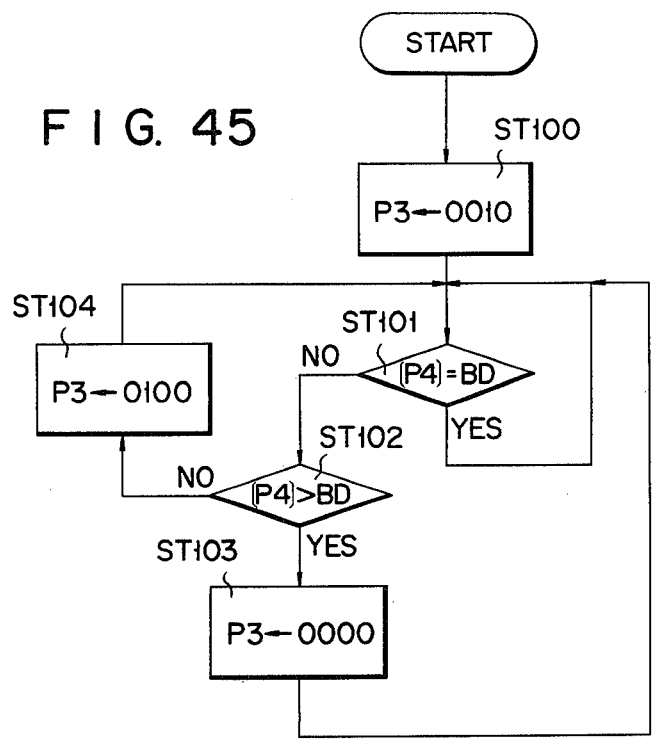
FIG. 45 shows a flow chart of a bight servocontrol program for the bight servocontrol of the multiple-pattern sewing machine by means of the construction as shown in FIG. 17.

FIGS. 44 and 45 show microprograms for the servocontrol of the bight and feed driver 16. FIG. 44 is a program for the feed servocontrol. When the feed data FD is prepared in accordance with the aforesaid bight and feed data forming program, the program of FIG. 44 is started. First, in Step 90, the microprocessing unit 10 supplies a digital code "0001" to the flip-flop $16_8$ and the buffer $16_1$ through the common bus 12 and port P3. Thus, in FIG. 17, the ports $P3_3$, $P3_2$, $P3_1$ and $P3_0$ are set to 0, 0, 0 and 1, respectively. Then, the flip-flop $16_8$ is reset, and the switch $18_{11}$ causes the amplifier $18_6$ to be connected with the amplifier $18_{12}$. The voltage based on the slider position of the variable resistor $18_2$ is amplified by the amplifier $18_6$, and applied to the input of the A/D converter $18_{13}$ through the amplifier $18_{12}$. The feed amount indicating signal digitized by the converter $18_{13}$ appears at the port P4 through the buffer $18_{15}$. The digital signal produced at the port P4 is fed back to the unit 10 by means of the bus 12.

In Step 91, it is decided whether or not the aforesaid digital output [P4] from the port P4 is equivalent to the feed data FD. If [P4]=FD, the feed servocontrol is deemed finished, and a loop for repeating Step 91 is formed again. On the other hand, if it is found in Step 91 that [P4]≠FD, then Step 92 is entered. In Step 92, it is decided whether or not [P4] is larger than the data FD. If [P4]>FD, that is, if the actual feed amount exeeds the target value (object level), then Step 93 is entered, a digital code "0000" is delivered to the port P3, and then Step 91 is resumed. When the port P3 is at "0000", charge-injection to the charge pump forming the f/v converter $16_3$ is stopped. Then, the input to the motor $16_7$ is reduced, whereby the feed amount is also decreased. Thereupon, the voltage supplied from the variable resistor $18_2$ is also lowered, accordingly the digital output [P4] is reduced. On the other hand, if it is found in Step 92 that [P4]<FD, that is, the actual feed amount is smaller than the target value, then Step 94 is entered. In Step 94, a digital code "1000" is delivered to the port P3, and then Step 91 is resumed. When the port P3 attains "1000", a charge (servocontrol pulse) is injected into the charge pump of the converter $16_3$. Then, the input to the motor $16_7$ increases, and the feed amount also increases, whereby the output [P4] is increased. Thus, when the digital code "0001" is supplied to the port P3, there is performed the feed servocontrol as shown in FIG. 18.

Meanwhile, the bight servocontrol is performed in accordance with a program as shown in FIG. 45. Immediately when the feed servocontrol is finished according to an instruction command from the timing signal generator 20, the program of FIG. 45 is started. First, in Step 100, the microprocessing unit 10 supplies a digital code "0010" to the port P3. Thus, in FIG. 17, the ports $P3_3$, $P3_2$, $P3_1$ and $P3_0$ are set to 0, 0, 1 and 0, respectively. Then, the flip-flop $16_8$ is set, and the switch $18_{11}$ causes the amplifier $18_5$ to be connected with the amplifier $18_{12}$. The voltage based on the slider position of the variable resistor $18_1$ is digitized in the same manner as mentioned in connection with FIG. 44, and produced at the port P4.

In Step 101, it is decided whether or not the output [P4] from the port P4 is equivalent to the bight data BD. If [P4]=BD, the bight servocontrol is deemed finished, and Step 101 is repeated. On the other hand, if it is found in Step 101 that [P4]≠BD, then Step 102 is entered. In Step 102, it is decided whether or not [P4] is larger than the data BD. If [P4]>BD, then Step 103 is entered, the digital code "0000" is delivered to the port P3, and then Step 101 is resumed. When the port P3 is at "0000", the output [P4] is reduced in the same manner as mentioned in connection with FIG. 44. On the other hand, if it is found in Step 102 that [P4]<BD, then Step 104 is entered. In Step 104, a digital code "0100" is delivered to the port P3, the then Step 101 is resumed. When the port P3 attains "0100", the input to the motor $16_6$ increases, and the bight amount also increases, whereby the output [P4] is increased. Thus, when the digital code "0010" is supplied to the port P3, there is performed the bight servocontrol as shown in FIG. 18.

Figure 25:
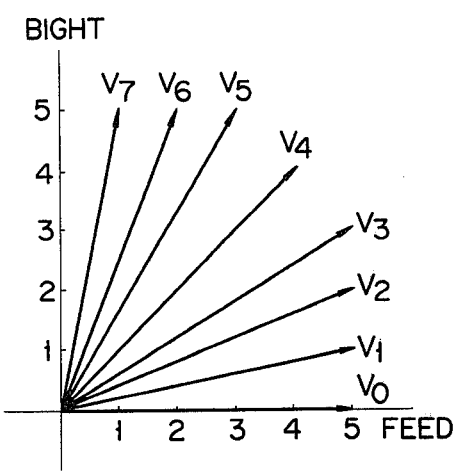
FIG. 25 shows 8 out of 32 basic vectors designated by the straight stitch data as shown in FIGS. 21 and 22.

The following operation may be made possible by additionally providing the buffer $16_1$ of FIG. 17 with another control port $P3_4$ and a gate circuit for exchanging the outputs $a_0$, $b_0$ of the buffer $16_1$ by means of such port $P3_4$ (not shown), for example. That is, the bight servocontrol may be achieved by means of the feed data, while the feed servocontrol may be achieved by means of the bight data. For the signal to be supplied to the port $P3_4$ there may be used the signal stored in the sign N/EX as shown in FIGS. 21 and 22. Such means may be used to prepare the basic vectors as shown in FIGS. 26 to 28 from the eight basic vectors as shown in FIG. 25.

FIGS. 46 to 64 show examples of the straight pattern, zigzag pattern and utility stitch pattern based on the aforementioned stitch data formats for straight and zigzag patterns. FIGS. 46 to 49 show straight stitch patterns, the stitch data of which are as shown in Table 6. FIGS. 50 to 55 show zigzag stitch patterns, the stich data of which are as shown in Table 7. Further, FIGS. 56 to 64 show utility stitch patterns, the stitch data of which are as shown in Table 8. Moreover, Table 9 shows the results of comparison of the number of bits required between cases where the stitch patterns of FIGS. 46 to 64 are formed in accordance with the stitch data formats according to this invention and where the same stitch patterns are formed in accordance with the prior art stitch data formats. In Table 9, however, 10 bits as end data for repetition, besides the stich data, are added to each bit number of the prior art formats.

TABLE 6

Figure 46:
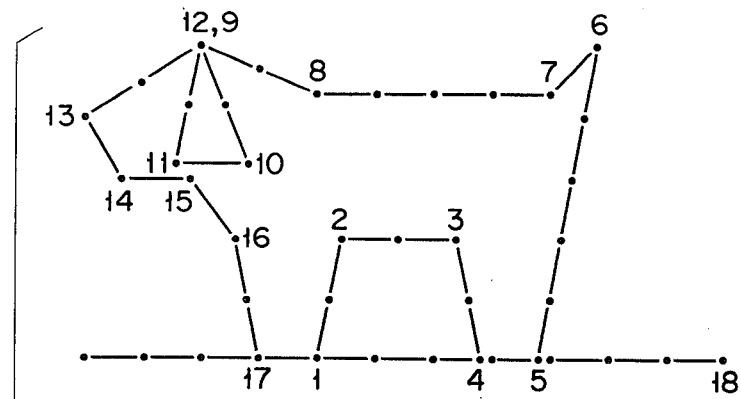
Figure 47:
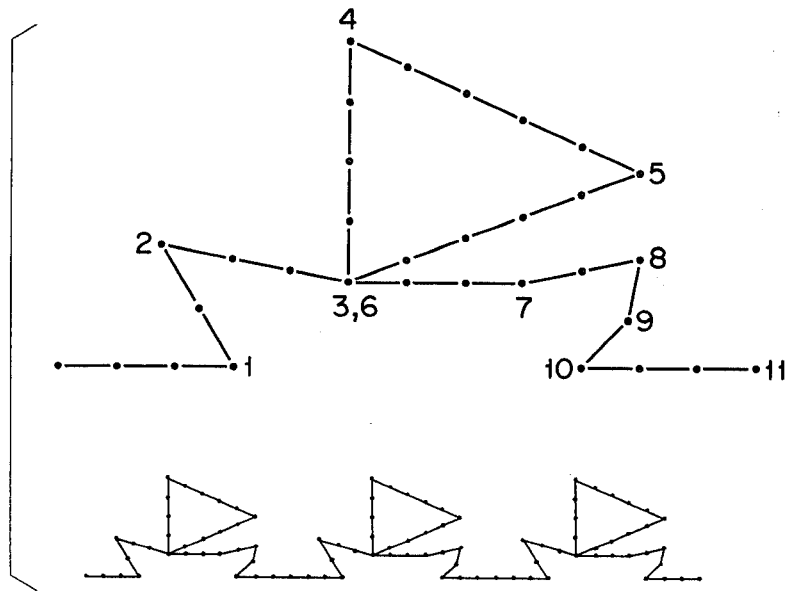

| DATA | FIG. 46 | FIG. 47 | FIG. 48 | FIG. 49 |
|---|---|---|---|---|
| BD | 00 | 00 | 0F | 00 |
| N | 2B | 20 | 25 | 29 |
|  | 40 | 30 | 34 | 40 |
|  | 27 | 2A | BC | 47 |
|  | 20 | BF | 1D | 90 |
|  | A9 | 48 | 1E | 93 |
|  | 10 | DE | A8 | 94 |
|  | 57 | D2 | 12 | 9D |
|  | 94 | 30 | 23 | 9E |
|  | C0 | 21 | 12 | 47 |
|  | 2E | 97 | A8 | 10 |
|  | AA | 94 | 1E | 9F |
|  | 80 | 30 | 1D | AD |
|  | 8E |  | 1B | AC |
|  | 9C |  | 20 | 28 |
|  | A9 |  | 96 | A4 |
|  | 70 |  | A5 | A3 |
|  |  |  | 96 | 91 |
|  |  |  | 20 | A0 |
|  |  |  | 1A | 70 |
|  |  |  | 1B |  |
|  |  |  | BC |  |
|  |  |  | 34 |  |

TABLE 7

| DATA | FIG. 50 | DATA | FIG. 51 | DATA | FIG. 52 | DATA | FIG. 53 | DATA | FIG. 54 | DATA | FIG. 55 |
|---|---|---|---|---|---|---|---|---|---|---|---|
| BD | 00 | BD | 00 | BD | 00 | BD | 14 | BD | 00 | BD | 00 |
| N | 1E | N | 1E | N | 1E | N | 21 | N | 1B | N | 15 |
| A1 | 1E34 | A1 | 1E34 | A1 | 0A34 | A1 | 0134 | A1 | C8F4 | A1 | 1E34 |
| B1 | 0E34 | B1 | 01F4 | B1 | 00F4 | B1 | 0054 | B1 | C6F4 | B1 | C6B4 |
| A2 | 22F4 | A2 | 21F4 | A2 | 00D4 | A2 | 0334 | A2 | A0D4 | A2 | E6B4 |
| B2 | 21F4 | B2 | 01F4 | A3 | 1434 | A3 | 0134 | B2 | A0D4 | B2 | 80B4 |
| A3 | 22F4 | A3 | 21F4 | B2 | 1434 | B2 | 2F34 |  |  | A3 | E0B4 |
| B3 | 21F4 |  |  | A4 | 00F4 | A4 | 0034 |  |  |  |  |
|  |  |  |  | B3 | 00D4 | B3 | 2534 |  |  |  |  |
|  |  |  |  |  |  | A5 | 2C34 |  |  |  |  |
|  |  |  |  |  |  | B4 | 00F4 |  |  |  |  |
|  |  |  |  |  |  | A6 | 0254 |  |  |  |  |
|  |  |  |  |  |  | A7 | 0154 |  |  |  |  |
|  |  |  |  |  |  | A8 | 0054 |  |  |  |  |
|  |  |  |  |  |  | A9 | 2134 |  |  |  |  |
|  |  |  |  |  |  | B5 | 80B4 |  |  |  |  |
|  |  |  |  |  |  | A10 | 0174 |  |  |  |  |
|  |  |  |  |  |  | A11 | 0034 |  |  |  |  |

TABLE 8

Figure 60:
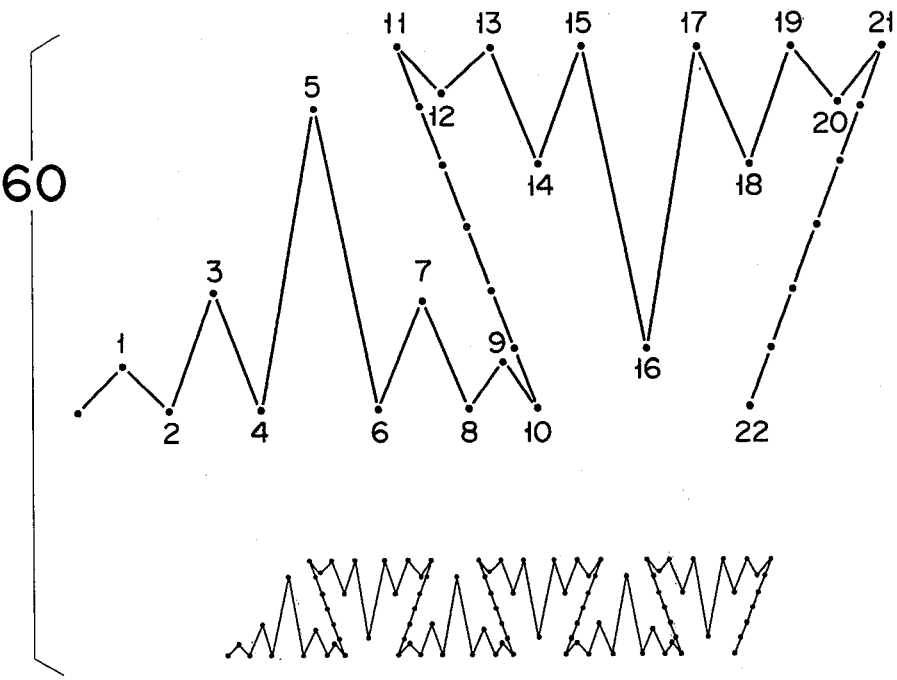
Figure 61:
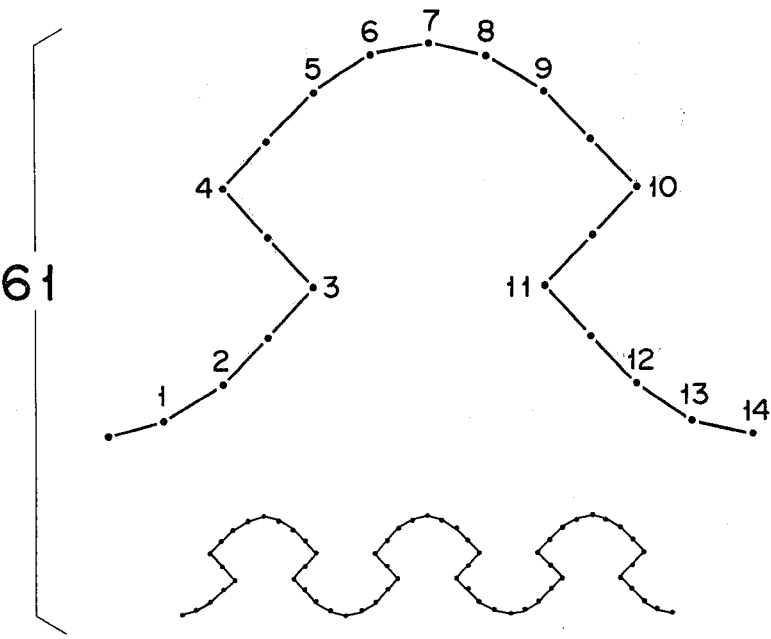

| DATA | FIG. 56 | FIG. 57 | FIG. 58 | FIG. 59 | FIG. 60 | FIG. 61 | FIG. 62 | FIG. 63 | DATA | FIG. 64 |
|---|---|---|---|---|---|---|---|---|---|---|
| BD | 00 | 00 | 00 | 00 | 00 | 00 | 0F | 0F | BD | 00 |
| N | 60 | 0E | 0A | 06 | 14 | 14 | 30 | 10 | N | 30 |
|  | 04 | 60 | 05 | 35 | 14 | 11 | 10 | 10 | A1 | 0F34 |
|  | 0A | 0B | 0D | BB | 9C | 13 | 90 |  | B1 | 0054 |
|  | 0C | 0D | AD |  | 05 | 24 | 10 |  | A2 | 0034 |
|  | 0A | 60 | 4D |  | 0A | 2C |  |  | A3 | 2A34 |
|  | 04 | 85 | AD |  | 8B | 24 |  |  | B2 | 00F4 |
|  | 0A | 0D | 8B |  | 0A | 13 |  |  | A4 | 00F4 |
|  | 8C |  | 0D |  | 07 | 11 |  |  | B3 | 00F4 |
|  | 0A |  |  |  | 0D | 9F |  |  | A5 | 00F4 |
|  | 84 |  |  |  | 05 | 9D |  |  | B4 | 00F4 |
|  | 0A |  |  |  | 0A | AC |  |  | A6 | 00F4 |
|  | 8C |  |  |  | 14 | A4 |  |  |  |  |
|  | 0A |  |  |  | 9C | AC |  |  | BD | 00 |
|  |  |  |  |  | 6A | 9D |  |  | N | 35 |
|  |  |  |  |  | 9C | 9F |  |  | A7 | 0F34 |
|  |  |  |  |  | 6A |  |  |  | B5 | 0054 |
|  |  |  |  |  | 9C |  |  |  | A8 | 0034 |
|  |  |  |  |  | 13 |  |  |  | A9 | 2A34 |
|  |  |  |  |  | 8A |  |  |  | A10 | 004A |
|  |  |  |  |  | 0A |  |  |  | B6 | 004A |
|  |  |  |  |  | 89 |  |  |  | B7 | 002A |
|  |  |  |  |  | 0D |  |  |  | A11 | 00EA |
|  |  |  |  |  | 07 |  |  |  | B8 | 00EA |
|  |  |  |  |  | 0D |  |  |  | A12 | 00EA |
|  |  |  |  |  | 8A |  |  |  | B9 | 00EA |
|  |  |  |  |  | 0A |  |  |  | A13 | 00EA |
|  |  |  |  |  | 06 |  |  |  | B10 | 00EA |
|  |  |  |  |  | 0A |  |  |  |  |  |
|  |  |  |  |  | 9C |  |  |  |  |  |
|  |  |  |  |  | 14 |  |  |  |  |  |
|  |  |  |  |  | E6 |  |  |  |  |  |

TABLE 9

| Stitch Pattern | Stitching Frequency | This Invention Byte | This Invention Bit | Prior Art Bit |
|---|---|---|---|---|
| FIG. 46 | 42 | 21 | 168 | 430 |
| 47 | 32 | 13 | 104 | 330 |
| 48 | 36 | 23 | 184 | 370 |
| 49 | 41 | 22 | 176 | 420 |
| 50 | 30 | 14 | 112 | 310 |
| 51 | 30 | 12 | 96 | 310 |
| 52 | 30 | 16 | 128 | 310 |
| 53 | 33 | 34 | 272 | 340 |
| 54 | 27 | 10 | 80 | 280 |
| 55 | 21 | 12 | 96 | 220 |
| 56 | 6 | 14 | 112 | 70 |
| 57 | 14 | 8 | 64 | 150 |
| 58 | 10 | 9 | 72 | 110 |
| 59 | 6 | 4 | 32 | 70 |
| 60 | 32 | 36 | 288 | 330 |
| 61 | 20 | 16 | 128 | 210 |
| 62 | 3 | 5 | 40 | 40 |
| 63 | 1 | 3 | 24 | 20 |
| 64 | 101 | 50 | 400 | 1020 |
| Total Bits |  |  | 2576 | 5340 |

By way of example, the numbers used for the aforementioned stitch pattern forming programs according to the invention are as follows:

| | | |
|---|---|---|
| Straight pattern forming program: | 80 (bytes) | 640 (bits) |
| Data table: | 32 | 256 |
| Zigzag pattern forming program: | 80 | 640 |
| Pattern selection program: | 15 | 120 |
| Pattern selection table: | 36 | 288 |
| Digital servocontrol: | 10 × 2 | 160 |
| Total: | 263 | 2,104 |

FIG. 65 is a block diagram showing a configuration of the control system for the multiple-pattern sewing machine, in which the microprocessing unit 10 is mainly used for the preparation of the desired pattern data, and the feed and bight servocontrol is performed by means of an analog servo loop. That is, the unit 10 supplies D/A converters $26_1$ and $26_2$, respectively, with feed and bight data corresponding to each stitch based on a pattern data designated by the pattern selector 14. Then, the converters $26_1$ and $26_2$ supply analog signal voltages corresponding to the feed and bight data to the non-inverted input terminal of voltage comparators $28_1$ and $28_2$, respectively. The output signals of the comparators $28_1$ and $28_2$ are amplified by amplifiers $30_1$ and $30_2$, and delivered to actuators $32_1$ and $32_2$ formed of e.g. reversible motors, respectively. Thereafter, the actuators $32_1$ and $32_2$ provide the workpiece and the bit tool 22, respectively, with displacements corresponding to the feed and bight data. These displacements are changed into their proportional feedback signal voltages by means of position detectors $34_1$ and $34_2$, respectively. Then, the feedback signals are supplied to the inverted input terminals of the comparators $28_1$ and $28_2$, respectively. Thus, the comparator 28, amplifier 30, actuator 32, and the detector 34 form an analog servoloop for the feed and bight servocontrol.

In the construction of FIG. 65 the action of the actuator 32 is not fed back to the unit 10. Therefore, in order sequentially to provide the stitch data for the unit 10 in response to the sewing operation of the sewing machine, a synchronizing signal synchronized with the action of the bit tol 22 is supplied to the unit 10. That is, a synchronizing signal generator 36 is provided for supplying the synchronizing signal (synchronizing pulse) to the unit 10. An input/output processor (e.g., T-3444 from Tokyo Shibaura Electric Co., Ltd.) may be diverted to the use for the CPU in the unit 10.

Figure 66:
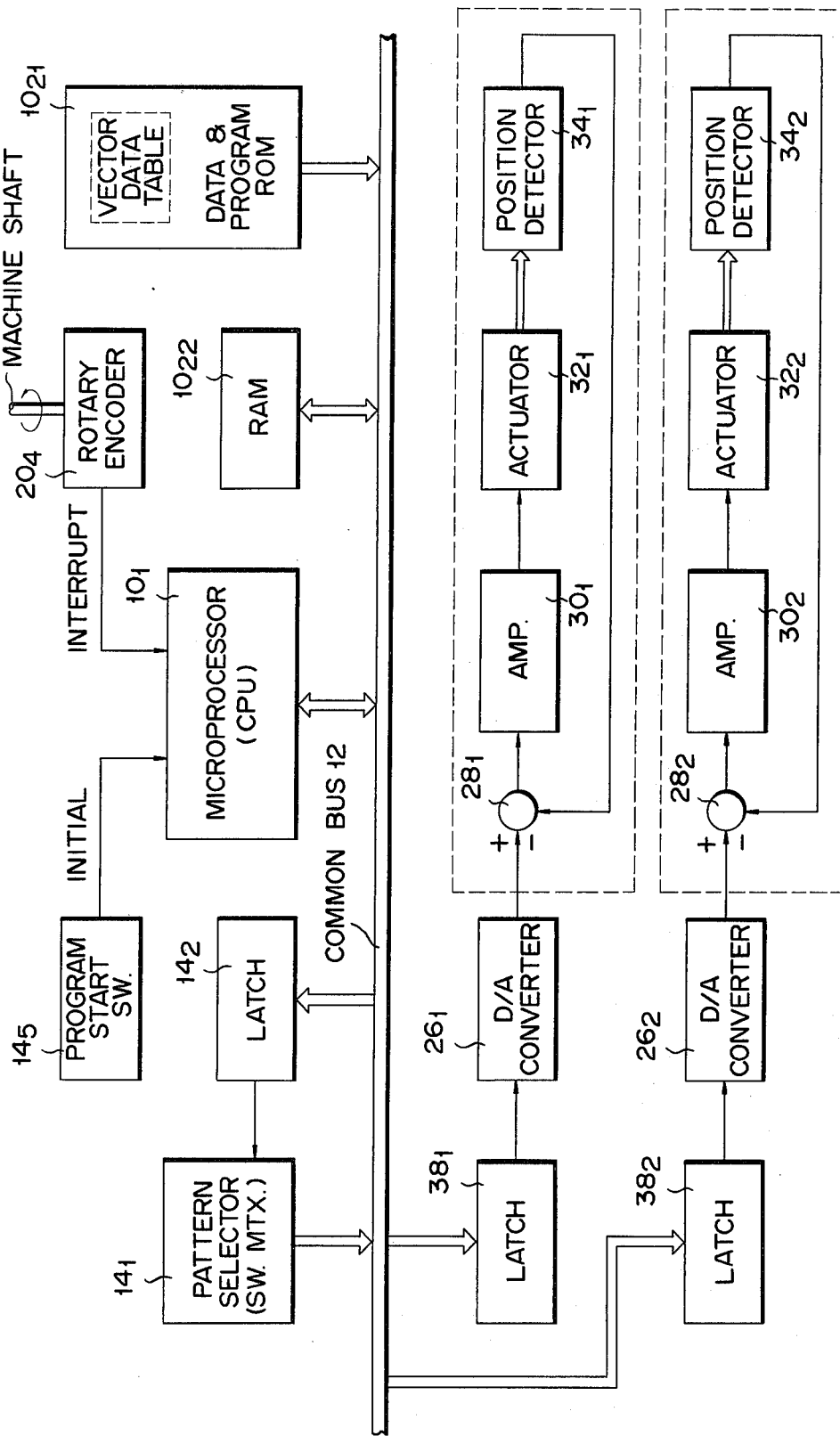
FIG. 66 is a block diagram showing another configuration of the control system for the multiple-pattern sewing machine according to the invention, in which the feed and bight servocontrol is performed by means of an analog servoloop.

FIG. 66 is a block diagram showing another configuration of the control system for the multiple-pattern sewing machine, in which the feed and bight servocontrol is performed by means of an analog servoloop. In FIG. 66 a rotary encoder $20_4$ is coupled with the shaft of a mechanism for moving the bit tool 22 down and up, giving an instruction for interruption to the microprocessor $10_1$ in response to the rotation of the shaft. That is, a manual change of the bight amount of the bit tool 22, for example, is made by means of an instruction for interruption given to the microprocessor $10_1$ by the encoder $20_4$, besides the instruction command for interruption in the normal sewing operation. A program start switch $14_5$, which is to start execution of the selection program is substantially the same as the designation switch $14_4$ of FIG. 16. Further, latches $38_1$ and $38_2$ are provided for temporarily storing feed and bight data for the feed and bight servocontrol, respectively. The ROM $102_1$ stores the aforesaid several pattern data and programs which may not be changed, while the RAM $102_2$ stores several data which may be changed according to the purposes.

Meanwhile, the RAM $102_2$ may be of a capacity to store a set of pattern data including the most numerous stitch data among the pattern data handled by the sewing machine, the desired data being supplied from the outside of the control system for the sewing machine by means of an optical data reader or magnetic card reader. By doing this, the memory capacity of the memory means may substantially be reduced. Thus, the means for supplying the desired pattern data from the outside of the control system for the sewing machine may naturally be used in the constructions as shown in FIGS. 6 and 65.

Since the interrupting function of the microprocessor (CPU) $10_1$ is available in the constructions of FIGS. 6 and 65, there may not be required any special synchronous circuit for synchronizing the operation of the microprocessor $10_1$ with the sewing operation of the sewing machine.

Figure 67:
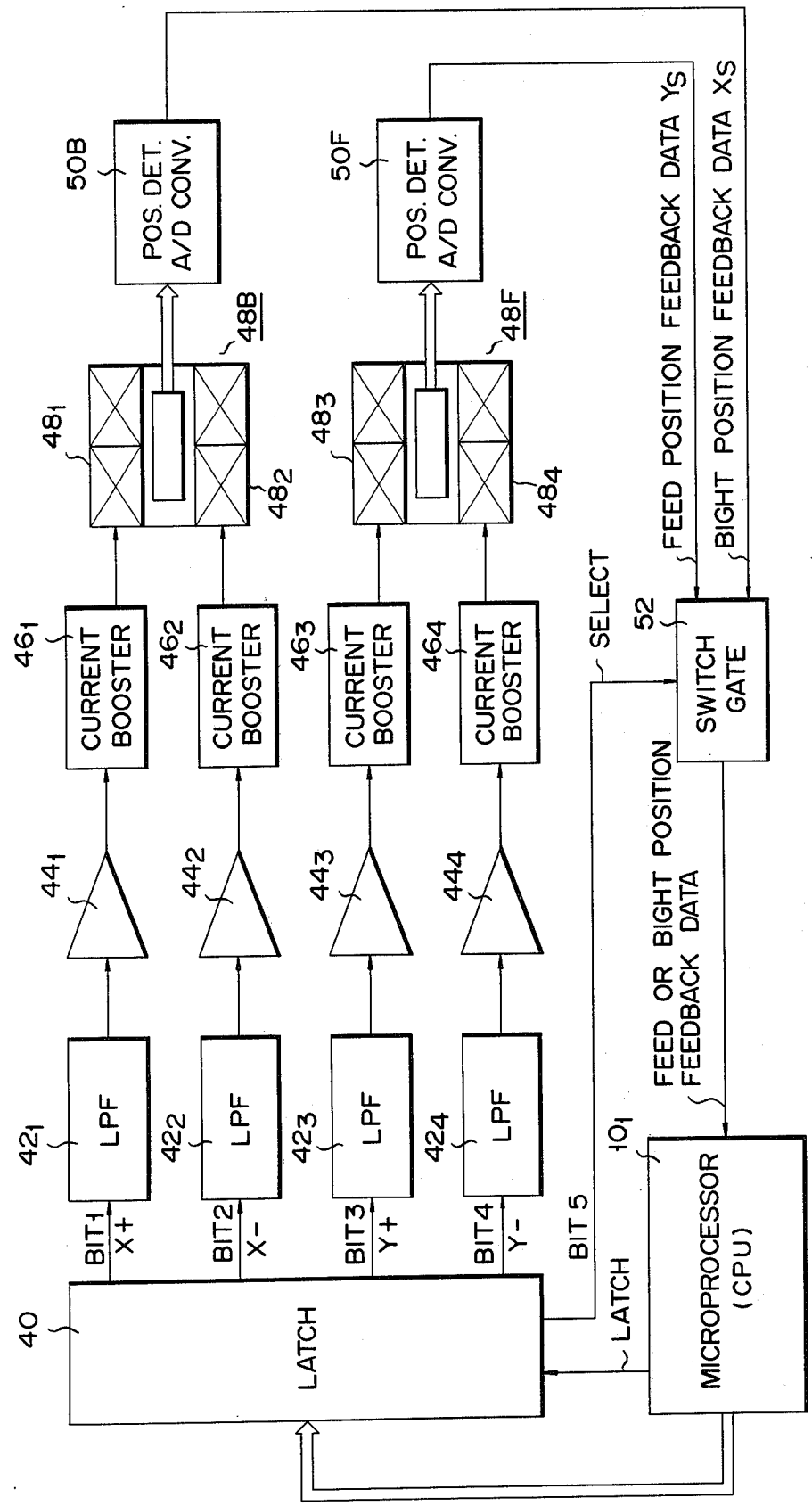
FIG. 67 is a block diagram showing an example of the control system for the multiple-pattern sewing machine according to the invention, in which a digital servoloop for the feed and bight servocontrol is formed without employing a D/A converter.

FIG. 67 shows a configuration in which a digital servo-loop is formed without employing a D/A converter. That is, bight and feed data supplied from the microprocessor $10_1$ is delivered to a latch 40, where they are temporarily stored. Among the data stored in the latch 40, a positive bight drive data $X+$ stored as bit 1 is supplied from the latch 40 to a low-pass filter (LPF) $42_1$. The LPF $42_1$, which functions as a kind of integrator, supplies a preamplifier $44_1$ with a signal at a level substantially proportional to the number of digital pulses possessed by the data $X+$. The signal amplified by the preamplifier $44_1$ is augmented into a current of a generous level by means of a current booster $46_1$. The output current from the booster $46_1$ is supplied to a coil $48_1$ of a reversible solenoid 48B as a bight actuator, the coil $48_1$ giving a positive bight displacement.

Likewise, a negative bight drive data $X-$, among the data stored in the latch 40 is derived as bit 2 from the latch 40. The data X- is converted into a current corresponding thereto through an LPF $42_2$, a preamplifier $44_2$ and a booster $46_2$, and supplied to a coil $48_2$ of the solenoid 48B which gives a negative bight displacement. Similarly, positive and negative feed drive data $Y+$ and $Y-$ are separately derived from the latch 40. The feed data $Y+$ and $Y-$ are supplied to coils $48_3$ and $48_4$ of a reversible solenoid 48F as a feed actuator to give positive and negative feed displacements through preamplifiers $44_3$ and $44_4$ and boosters $46_3$ and $46_4$, respectively.

The solenoid 48B gives the bit tool 22 a mechanical displacement determined by the ratio of the current supplied to the coil $48_1$ to the current supplied to the coil $48_2$. That is, if the ratio is 1:1, the bight displacement is not given to the bit tool 22. If the current through the coil $48_1$ is higher than the current through the coil $48_2$, the bit tool 22 is given a positive bight displacement. If the current through the coil $48_2$ is higher than the current through the coil $48_1$, however, the bit tool 22 is given a negative bight displacement. The levels of the currents flowing through the coils $48_1$ and $48_2$ are proportional to the numbers of pulses of the data $X+$ and $X-$, respectively, as aforesaid, so that the bight displacement may be determined by the digital codes of the data $X+$ and $X-$. As for the feed displacement, it may be determined by the digital codes of the data $Y+$ and $Y-$ in just the same manner as the case of the bight displacement. In this case, it is to be observed that no special D/A converter is used in giving the analog bight (feed) displacement in accordance with the bight (feed) data formed of a digital code.

The bight and feed displacements given by the solenoids 48B and 48F are delivered to A/D converters 50B and 50F for position detection, respectively. The converters 50B and 50F supplies a switch gate 52 with feedback data Xs and Ys indicating the bight and feed positions, respectively. The gate 52 supplies either the data Xs or Ys to the microprocessor $10_1$ as a feedback data for the digital servocontrol, in accordance with a selection command given by a selection signal derived as bit 5 from the latch 40. That is, the microprocessor $10_1$ performs the bight and feed servocontrol by means of time sharing. Since the bight (feed) displacement is determined by the ratio of the data $X+$ to $X-$ ($Y+$ to $Y-$) in the construction of FIG. 67, the execution speed of the microprocessor $10_1$ and the conversion speed of the A/D converters 50B and 50F are required to be sufficiently high. Suitably used for these converters 50B and 50F are linear encoders employing a coding board based on the Gray code, for example.

FIG. 68 is a flow chart showing an example of the position control program for the digital servocontrol as shown in FIG. 67. First, in Step 110, the feedback data Xs is introduced into the microprocessor $10_1$. At this time, a bight control data X or a control target is stored in the microprocessor $10_1$. Then, in Step 111, the data Xs is compared with the data X. If it is concluded in Step 111 that Xs=X, the data $X+$, $X-$ and Y are selected in Step 112. Then, the output bits 5 to 1 of the latch 40 of FIG. 67 become, 1, 0, 0, 1 and 1 repsectively, and a driving current is supplied to both the coils $48_1$ and $48_2$ of the solenoid 48B. In this case there is caused no bight position displacement. Thereafter, Step 113 is entered. If it is concluded in Step 111 that Xs<X, however, the data $X+$ and Y are selected in Step 114. Then, the output of the latch 40 becomes "10001", and the driving current is supplied only to the coil $48_1$. In this case the bight position is displaced in the positive direction. Thereafter, Step 113 is entered. On the other hand, if it is decided in Step 111 that Xs>X, the data $X-$ and Y are selected in Step 115. Then, the output of the latch 40 becomes "10010", and the driving current is supplied only to the coil $48_2$. In this case the bight position is displaced in the negative direction. Thereafter, Step 113 is entered.

In Step 113, the feedback data Ys is introduced into the microprocessor $10_1$. Then, in Step 116, the data Ys is compared with a feed control data Y or a control target. If it is concluded in Step 116 that Ys=Y, the data $Y+$, $Y-$ and X are selected in Step 117. Then, the output of the latch 40 becomes "01100", and the driving current is supplied to both the coils $48_3$ and $48_4$ of the solenoid 48F. In this case there is caused no feed position displacement. Thereafter, Step 110 is resumed. If it is concluded in Step 116 that Ys<Y, however, the data Y+ and X are selected in Step 118. Then, the output of the latch 40 becomes "00100", and the driving current is supplied only to the coil 48₃. In this case the feed position is displaced in the positive direction. Thereafter, 3. The sewing control system of claim 2 wherein said stitch data further includes a vector combination code for indicating whether to add or subtract the basic vector specified by a said stitch data to or from the basic vector specified by the immediately preceding stitch data in said sequence of stitch data.

4. The sewing control system of claim 1 wherein said servocontrol means coupled to said data processor means, said feed driver means, and said bight driver means for determining the actual feed displacement of said workpiece and the actual bight displacement of said actuator means and for cooperating with said data processor means to adjust the value of said feed driving signal and said bight driving signal when said determined actual values of said feed displacement and said bight displacement differ from said target values of feed displacement and bight displacement.

15. A sewing control system according to claim 14 wherein said feed driver means includes a frequency-to-voltage converter for converting said feed driving signal into a voltage corresponding to a frequency component of said feed driving signal, a linear amplifier for amplifying the voltage derived from said frequency-to-voltage converter, and a linear motor for providing workpiece feed displacement relative to said actuator means in accordance with the electric power derived from said linear amplifier.

16. A sewing control system according to claim 14 wherein said feed driver means includes a buffer for supplying a signal indicating a frequency component of said feed driving signal, a charge pump for supplying a voltage corresponding to the frequency component of the signal supplied from said buffer, a linear amplifier for amplifying the voltage supplied from said charge pump, and a linear motor for providing workpiece feed displacement relative to said actuator means in accordance with the electric power derived from said linear amplifier.

17. A sewing control system according to claim 16 wherein said linear motor comprises a stepping motor.

18. A sewing control system according to claim 14 wherein said bight driver means includes a frequency-to-voltage converter for converting said bight driving signal into a voltage corresponding to a frequency component of said bight driving signal, a linear amplifier for amplifying the voltage derived from said frequency-to-voltage converter, and a linear motor for providing said bight displacement in accordance with the electrical power derived from said linear amplifier.

19. A sewing control system according to claim 14 wherein said bight driver means includes a buffer for supplying a signal including a frequency component corresponding to said bight driving signal, a charge pump for supplying a voltage corresponding to the frequency component of the signal supplied from said buffer, a linear amplifier for amplifying the voltage supplied from said charge pump, and a linear motor for providing said bight displacement in accordance with electrical power derived from said linear amplifier.

20. A sewing control system according to claim 19 wherein said linear motor comprises a stepping motor.

21. A sewing control system for a multiple pattern sewing machine for sewing stitch patterns on workpieces, said system comprising:
memory means for storing a plurality of sets of pattern data including sets of pattern data for sewing zigzag patterns on said workpieces, each said set of pattern data for sewing a zigzag pattern including a sequence of stitching data indicating in polar coordinates a series of stitches to be sewn on a said workpiece, each said stitching data including first and second stitch data for defining the outer stitch limits of a stitch in a said zigzag pattern;
means for designating a desired set among said plurality of sets of pattern data;
data processor means coupled with said memory means and said designating means for generating sewing control signals corresponding to said designated set of pattern data;
actuator means coupled with said data processor means for performing sewing operations in response to said sewing control signals in order to form on a said workpiece a stitch pattern corresponding to said designated set of pattern data; and
timing generator means coupled with said data processor means and said actuator means for supplying timing signals to synchronize the generation of said sewing control signals by said data processor means with said sewing operations performed by said actuator means.

22. The sewing control system of either claim 1 or claim 21 wherein said data processor means is a microprocessor.

23. The sewing control system of claim 21 wherein said designating means comprises a switch matrix means.

24. The sewing control system of claim 23 wherein said switch matrix means comprises:
a switching matrix having column lines and row lines;
a plurality of key switch means for selectively coupling a said row line to a said column line;
latch memory means for selectively supplying key switch sampling pulses to said row lines of said switching matrix; and
buffer memory means connected to said column lines for receiving a said key switch sampling pulse when a said key switch means selectively couples a said row line to a said column line at the same time that a said key switch sampling pulse is supplied to said coupled row line.

25. The sewing control system of claim 21 or claim 23 wherein said sewing control signals include a feed driving signal and a bight driving signal for reflecting a target workpiece feed displacement and a target actuator bight displacement, respectively, wherein said system further includes:
feed driver means for controlling the feed displacement of a said workpiece relative to said actuator means in response to said feed driving signal;
bight driver means for controlling the bight displacement of said actuator means in response to said bight driving signal; and
servocontrol means coupled to said data processor means, said feed driver means, and said bight driver means for determining the actual feed displacement of said workpiece and the actual bight displacement of said actuator means and for cooperating with said data processor means to adjust the value of said feed driving signal and said bight driving signal when said determined actual values of said feed displacement and said bight displacement differ from said target values of feed displacement and bight displacement.

26. A sewing control system for a multiple pattern sewing machine for sewing stitch patterns on workpieces, comprising:
memory means for storing (1) a plurality of sets of pattern data, each said set of pattern data including a plurality of digitized stitch data indicating in polar coordinates the length and direction of at least one stitch to be sewn by said sewing machine, (2) a selection program for selecting one set of pattern data among said plurality of sets of pattern data, and (3) a stitch data forming program for preparing feed data and bight data corresponding to each said stitch data included in said selected set of pattern data;

means for designating a desired set among said plurality of sets of pattern data;

data processor means coupled with said memory means and said designating means for (1) referring to said designated set of pattern data in accordance with said selection program, (2) preparing in accordance with said stitch data forming program feed data and bight data corresponding to each stitch data of said designated set of pattern data selected as a result of said reference, and (3) generating sewing control signals consisting of digital codes including said stitch data included in said designated set of pattern data, said feed data and bight data;

actuator means coupled with said data processor means to form a servoloop for performing sewing operations in response to said sewing control signals in order to form on a said workpiece a stitch pattern corresponding to said designated set of pattern data; and timing signal generator means coupled with said data processor means for indicating to said data processor means the timing sequence for said sewing control signals.

27. The sewing control system of claim 26 wherein said designating means comprises a switch matrix means.

28. The sewing control system of claim 27 wherein said switch matrix means comprises:
a switching matrix having column lines and row lines;
p1 key switch means for selectively coupling a said row line to a said column line;
latch memory means for selectively supplying key switch sampling pulses to said row lines of said switching matrix; and
buffer memory means connected to said column lines for receiving a said key switch sampling pulse when a said key switch means selectively couples a said row line to a said column line at the same time that a said key switch sampling pulse is supplied to said coupled row line.

29. The sewing control system of claim 26 or claim 28 wherein said sewing control signals include a feed driving signal and a bight driving signal for reflecting a target workpiece feed displacement and a target actuator bight displacement, respectively, wherein said system further includes:
feed driver means for controlling the feed displacement of a said workpiece relative to said actuator means in response to said feed driving signal;
bight driver means for controlling the bight displacement of said actuator means in response to said bight driving signal; and
servocontrol means coupled to said data processor means, said feed driver means, and said bight driver means for determining the actual feed displacement of said workpiece and the actual bight displacement of said actuator means and for cooperating with said data processor means to adjust the value of said feed driving signal and said bight driving signal when said determined actual values of said feed displacement and said bight displacement differ from said target values of feed displacement and bight displacement.

30. The sewing claim system of claim 1 or claim 26 wherein said actuator means includes a sewing needle reciprocated through a preselected path and wherein said system further includes needle position detector means for producing a timing pulse whenever said sewing needle attains a selected position in said preselected path.

31. The sewing control system of claim 30 wherein said timing signal generator means produces said timing signals in response to said timing pulses produced by said needle position detector means.

32. A sewing control system according to claim 31 wherein said timing signal generator means synchronizes said data processor means to execute said stitch data forming program by producing first timing information before the reciprocation of said sewing needle reaches a predetermined point in order to secure time for processing said stitch data forming program.

33. A sewing control system according to claim 29 wherein said needle position detector means includes a power source, a rotatable disc connected to said power source and coupled with said sewing needle by means of a link mechanism for reciprocating said sewing needle, said disc including a peripherally located notch, a light source positioned on one side of said disc, for illuminating a point on the periphery of said disc, and a light sensor located on the other side of said disc and aligned with said light source, said needle position detector means generating a timing pulse related to the position of said sewing needle when said disc is rotated to position said notch between said light source and said light sensor to permit light to pass from said light source to said light sensor.

34. A sewing control system according to claim 29 wherein said needle position detector means includes a rotatable disc connected to a power source and coupled with said sewing needle by means of a link mechanism for reciprocating said sewing needle when said disc is rotated, said disc including alternate radial segments of materials of a first magnetic flux and a second magnetic flux, and a magnetic flux sensor located adjacent said disc for producing timing pulses related to the reciprocation of said sewing needle when said disc is rotated to rotate said radial segments past said magnetic flux sensor.

35. A sewing control system for a multiple pattern sewing machine for sewing stitch patterns on workpieces, said system comprising:
memory means for storing (1) a plurality of sets of pattern data, each said set of pattern data including a sequence of stitch data indicating a series of stitches to be sewn by said sewing machine, (2) a selection program for controlling the selection of one set of pattern data among said plurality of sets of pattern data, and (3) a stitch data forming program for preparing feed data and bight data corresponding to each said stitch data included in said selected set of pattern data, each said stitch data including a symbol code for designating one of a plurality of basic vectors for specifying the length and direction of one stitch in polar coordinates, a stitching frequency code for indicating the number of consecutive stitches to be sewn according to said basic vector designated by said symbol code, and a first sign code for indicating whether to add or subtract said prepared feed data and bight data formed for said stitch data to or from the feed data and bight data, respectively, formed for the preceding stitch data in said sequence of stitch data;

means for designating a desired set among said plurality of sets of pattern data;

data processor means coupled with said memory means and said designating means for referring to said designated set of pattern data in accordance with said selection program, for preparing in accordance with said stitch data forming program feed data and bight data corresponding to each said stitch data included in said selected set of pattern data, and for generating sewing control signals consisting of digital codes including said stitch data included in said selected set of pattern data, said prepared bight data and said prepared feed data;

actuator means, including a reciprocated sewing needle, for performing sewing operations in response to said sewing control signals in order to form on a said workpiece a pattern corresponding to said designated set of pattern data, said actuator means being coupled with said data processor means for forming a servoloop with said data processor means;

needle position detector means producing timing pulses in response to the position of said reciprocated sewing needle; and timing logic generator means coupled with said data processor means for synchronizing the generation of said sewing control signals by said data processor means with said sewing operations performed by said actuator means in response to said timing pulses produced by said needle position detecting means.

36. A sewing control system for a multiple pattern wing machine for sewing stitch patterns on workeces, said system comprising:

data processor means coupled with said memory means and said designating means for referring to said designated set of pattern data in accordance with said selection program and for generating sewing control signals consisting of digital codes corresponding to the pattern data selected as a result of said reference;

actuator means, including a reciprocated sewing needle, for performing sewing operations in response to said sewing control signals in order to form on a workpiece a pattern corresponding to said designated set of pattern data, said actuator means being coupled with said data processor means for forming a servoloop; and timing signal generator means coupled with said data processor means for synchronizing the generation of said sewing control signals by said data processor means with said sewing operations performed by said actuator means in response to the reciprocation of said sewing needle.

memory means for storing (1) a plurality of sets of pattern data, each said set of pattern data including a sequence of stitch data indicating a series of stitches to be sewn by said sewing machine, (2) a selection program for controlling the selection of one set among said plurality of sets of pattern data, and (3) a stitch data forming program for preparing feed data and bight data corresponding to each of said stitch data included in said selected set of pattern data, each said stitch data being formed of a symbol code for designating one of a plurality of basic vectors to specify the length and direction of one stitch in polar coordinates, a first stitching frequency code for indicating the number of consecutive stitches to be sewn in accordance with said basic vector designated by said symbol code, a first sign code for indicating whether to add or subtract the feed and data bight data of the basic vector designated by said symbol code to or from the feed data and bight data, respectively, included in the preceding stitch data, a second sign code having a zero value or a non-zero value for specifying variable length or fixed length stitching, respectively, a stitch length code for indicating the number of consecutive stitches to be sewn in accordance with said basic vector designated by said symbol code, and a second stitching frequency code for indicating that a stitch specified by said first and second sign codes is repeated when said second sign code specifies a variable length stitch.

means for designating a desired set among said plurality of sets of pattern data;

data processor means coupled with said memory means and said designating means for referring to said designated set of pattern data in accordance with said selection program and for generating sewing control signals consisting of digital codes corresponding to the pattern data selected as a result of said reference;

actuator means, including a reciprocated sewing needle, for performing sewing operations in response to said sewing control signals in order to form on a workpiece a pattern corresponding to said designated set of pattern data, said actuator means being coupled with said data processor means for forming a servoloop; and timing signal generator means coupled with said data processor means for synchronizing the generation of said sewing control signals by said data processor means with said sewing operations performed by said actuator means in response to the reciprocation of said sewing needle.

37. A sewing control system for a multiple pattern sewing machine for sewing stitch patterns on workpieces, said system comprising:

memory means for storing (1) a plurality of sets of pattern data, each said set of pattern data including a sequence of stitch data indicating a series of stitches to be sewn by said sewing machine, (2) a selection program for controlling the selection of one set among said plurality of sets of pattern data, and (3) a stitch data forming program for preparing workpiece feed data and bight data corresponding to each said stitch data included in said selected set of pattern data, each said stitch data including a symbol code for designating one of a plurality of basic vectors to specify the length and direction of one stitch in polar coordinates, a first stitching frequency code having a zero value or a non-zero value for indicating the number of consecutive stitches to be sewn in accordance with said basic vector designated by said symbol code, said first stitching frequency code also for indicating fixed length or variable length stitching according to said non-zero or zero value, respectively, a first sign code for indicating whether to add or subtract the prepared feed data and bight data for said selected basic vector to or from the feed data and bight data, respectively, of the preceding stitch data in said sequence, a second sign code for specifying a selected length of one stitch when said first stitching frequency code indicates variable length stitching, a stitch length code for indicating a multiplier of said basic vector indicated by said selected symbol code in order to change the length of said basic vector, and a second stitching frequency code for indicating the number of stitches as specified by said first sign code and said second sign code to be consecutively sewn when said first stitching frequency code indicates variable length stitching;

means for designating a desired set among said plurality of sets of pattern data;

data processor means coupled with said memory means and said designating means (1) for referring to said designated set of pattern data in accordance with said selection program, (2) for preparing in accordance with said stitch forming program feed data and bight data corresponding to each stitch data included in said set of pattern data selected as a result of said reference, and (3) for generating sewing control signals consisting of digital codes and including the stitch data included in said selected set of pattern data and said feed data and said bight data;

actuator means, including a reciprocated sewing needle, for performing sewing operations in response to said sewing control signals in order to form on a workpiece a pattern corresponding to said designated set of pattern data; said actuator means being coupled with said data processor means for forming a servoloop; and timing signal generator means for said data processor means for synchronizing the generation of said sewing control signals by said data processor means with said sewing operations performed by said actuator means in response to the reciprocation of said sewing needle.

38. A sewing control system according to claim 37 wherein said stitch data further includes a third sign code having a first condition and a second condition for directing said feed and data bight data to be considered as feed and bight data, respectively, under said first condition or as bight data and feed data, respectively, under said second condition.

39. A sewing control system according to claim 38 wherein said first sign code and said third sign code each has at least first and second values and wherein said basic vectors are defined in (1) the first quadrant of a polar-coordinate plane when each of said first sign code and said third sign code indicate said first value, (2) the second quadrant of a polar-coordinate plane when said first and third sign codes indicate said first and second values, respectively, (3) the third quadrant of a polar-coordinate plane when said first and third sign codes indicate said second and first values, respectively, and (4) the fourth quadrant of a polar-coordinate plane when both said first and third sign codes indicate said second value.

40. A sewing control system for use with a multiple pattern sewing machine to sew selected stitch patterns on a workpiece, said sewing machine including a sewing needle, means for changing the bight of said sewing needle, and means for displacing said workpiece with respect to said sewing needle, said system comprising:

memory means for storing a plurality of sets of pattern data, each said set of pattern data including a sequence of stitch data indicating the stitches in a pattern to be sewn by said sewing machine, each said stitch data including (1) a stitch vector selected from a set of basic stitch vectors, said selected stitch vector specifying the length and direction of a said stitch in polar coordinates, and (2) a repetition code for indicating the number of consecutive stitches to be sewn in accordance with said selected stitch vector;

means for designating a desired set among said plurality of sets of pattern data;

data processor means coupled with said memory means and said designating means for generating sewing control signals corresponding to said designated set of pattern data;

actuator means including said sewing needle for performing sewing operations in response to said generated sewing control signals to form on a said workpiece a stitch pattern corresponding to said designated set of pattern data; and means for generating timing signals to syncronize the generation of said sewing control signals by said data processor means with the sewing operations performed by said actuator means.

41. The sewing control system of claim 40 wherein each said selected stitch data further includes bight data for specifying the length of a transverse shift of said sewing needle with respect to said workpiece and feed data for specifying the length of a longitudinal feed of said workpiece relative to said sewing needle.

42. The sewing control system of claim 40 wherein said set of basic stitch vectors comprises a plurality of stitch vectors, each said stitch vector corresponding to a selected set of polar coordinates in a polar coordinate plane.

43. The sewing control system of claim 40 wherein said designated set of pattern data corresponds to a zigzag pattern and wherein said zigzag pattern includes two sets of stitch data, one set of stitch data specifying a first lateral outside limit of said designated zigzag pattern and the other set of stitch data specifying a second lateral outside limit for said designated zigzag pattern.

44. The sewing control system of claim 41 wherein said sewing control signals generated by said data processor means includes a bight driving signal corresponding to said bight data and a feed driving signal corresponding to said feed data.

45. The sewing control system of claim 44 further including servocontrol means cooperating with said data processor means for controlling the bight of said needle with respect to said workpiece in accordance with said bight driving signal and for controlling the feed displacement of said workpiece with respect to said sewing needle in response to said feed driving signal.

46. The sewing control system of claim 45 wherein said servocontrol means comprises:

bight adjusting means for generating an electrical signal corresponding to said bight driving signal to control said bight changing means to change the bight of said sewing needle in an amount corresponding to said bight data;

bight position detector means for sensing the actual bight position of said sewing needle and for generating a bight feedback signal corresponding thereto;

feed adjusting means for generating an electrical signal corresponding to said feed driving signal to control said displacing means to displace said workpiece relative to said sewing needle in an amount corresponding to said feed data;

feed position detector means for sensing the actual feed displacement of said workpiece with respect to said sewing needle, and for generating a feed feedback signal corresponding thereto; and feedback means for supplying said bight feedback signal and said feed feedback signal to said data processor means to enable said data processor means to adjust the value of a subsequently generated bight driving signal or feed driving signal if said detected actual bight position or said detected actual feed position differs from a desired bight position or feed position, respectively.

47. The sewing control system of claim 46 wherein said bight adjusting means comprises:

bight buffer means receiving said bight driving signal for generating and AC bight driving signal having a frequency corresponding to said received bight driving signal;

bight frequency-to-voltage converter means for generating a bight voltage driving signal corresponding to the frequency of said AC bight driving signal;

means for amplifying said AC bight driving signal to produce an amplified AC bight driving signal; and bight linear motor means receiving said amplified AC bight driving signal for adjusting the bight of said sewing needle.

48. The sewing control system of claim 47 wherein said bight position detector means comprises:

bight detector means for generating a bight voltage signal corresponding to the mechanical movement of said bight linear motor.

49. The sewing control system of claim 46 wherein said feed adjusting means comprises:

feed buffer means receiving said feed driving signal for generating an AC feed driving signal having a frequency corresponding to said received feed driving signal;

feed frequency-to-voltage converter means for generating a feed voltage driving signal corresponding to the frequency of said AC feed driving signal;

means for amplifying said AC feed driving signal to produce an amplified AC feed driving signal; and feed linear motor means receiving said amplified AC feed driving signal for adjusting the feed of said workpiece with respect to said sewing needle.

50. The sewing control system of claim 49 wherein said feed position detector means comprises a feed detector for generating a feed voltage signal corresponding to the mechanical movement of said feed linear motor.

51. The sewing control system of claim 50 wherein said feedback means comprises:

signal selector means for receiving said bight voltage signal and said feed voltage signal and for selectively supplying said bight voltage signal or said feed voltage signal;

means for receiving and for amplifying said selectively supplied signal to produce an amplified selectively supplied signal;

analog-to-digital converter means for converting said amplified selectively supplied signal into a corresponding digital selectively supplied signal; and buffer means receiving said digital selectively supplied signal for supplying said digital selectively supplied signal to said data processor means whereby a digital representation of either said bight voltage signal or said feed voltage signal is selectively supplied to said data processor means.

52. The sewing control system of claim 40 wherein said designating means comprises a switch matrix means.

53. The sewing control system of claim 52 wherein said switch matrix means comprises:

a switching matrix having column lines and row lines;

key switch means for selectively coupling a said row line to a said column line;

latch memory means for selectively supplying key switch sampling pulses to said row lines of said switching matrix; and switch matrix buffer means connected to said column lines for receiving a said key switch sampling pulse when a said key switch means selectively couples a said row line to a said column line at the same time that a said key switch sampling pulse is supplied to said coupled row line.

54. The sewing control system of claim 45 wherein said servocontrol means comprises a bight servocontrol means and a feed servocontrol means and wherein said bight servocontrol means comprises:

bight position detector means for generating a bight signal reflecting the actual bight position of said sewing needle;

bight digital-to-analog converter means receiving said bight driving signal for producing a target bight position signal reflecting a desired bight position for said sewing needle;

means for comparing said target bight position signal with said bight signal and for generating a bight correction signal reflecting the difference therebetween; and bight motor means for adjusting the bight of said sewing needle according to said bight correction signal to thereby adjust the bight of said sewing needle to be closer to said desired bight position.

55. The sewing control system of claim 54 wherein said feed servocontrol means further comprises:

feed position detector means for generating a feed signal reflecting the actual feed position of said workpiece with respect to said sewing needle;

feed digital-to-analog converter means receiving said feed driving signal for producing a target feed position signal reflecting a desired feed position for said workpiece;

means for comparing said target feed position signal to said feed signal and for generating a feed correction signal reflecting the difference therebetween; and feed motor means for adjusting the feed displacement of said workpiece with respect to said sewing needle according to said feed correction signal to thereby adjust the feed displacement of said workpiece with respect to said sewing needle to be closer to said desired feed displacement.

56. A sewing control system of claim 40 wherein said timing signal generator means comprises:

a disc having a notch located on its periphery;

means for rotating said disc in a manner coordinated with the movement of said sewing needle;

a light source positioned on one side of said disc for illuminating the periphery of said disc; and light transducer means positioned on the other side of said disc and aligned with said light source, said light transducer means for generating a timing signal whenever said disc is rotated to position said notch between said light source and said light transducer to permit light from said light source to pass through said notch in said disc and illuminate said light transducer means.

57. The sewing control system of claim 40 wherein said timing signal generator means includes a needle position detector means and wherein said needle position detector means comprises:
a disc comprised of alternate radial portions of a first magnetic flux and a second magnetic flux;
means for rotating said disc in a manner coordinated with the movement of said sewing needle; and
magnetic flux-sensing means positioned proximate to said disc for sensing changes in magnetic flux as said disc is rotated to sequentially pass said radial portions past said magnetic flux-sensing means, said magnetic flux-sensing means producing timing pulses related to said sensed magnetic flux changes.

58. A sewing control system for use with a multiple pattern sewing machine to sew selected stitch patterns on a workpiece, said sewing machine including a sewing needle, means for changing the bight of said sewing needle with respect to said workpiece, and means for displacing said workpiece with respect to said sewing needle, said sewing control system comprising:
a program start switch for intiating the operation of said sewing control system;
memory means for storing a plurality of sets of pattern data, each said set of pattern data including a sequence of stitch data indicating a series of stitches to be sewn by said sewing machine, each said stitch data including a stitch vector selected from a set of basic stitch vectors, said selected stitch vector specifying in polar coordinates a stitch length and a stitch direction, and a repetition code indicating the number of consecutive stitches to be sewn in accordance with said selected stitch vector;
switch matrix means for designating a desired set among said plurality of sets of pattern data;
random access memory means for storing said designated set of pattern data;
data processor means coupled with said memory means, said random access memory means and said switch matrix means and initiated by said initiating signal for generating sewing control signals corresponding to said designated set of pattern data stored in said random access memory means;
actuator means for performing sewing operations in response to said generated sewing control signals to form on a said workpiece a stitch pattern corresponding to said designated set of pattern data; and
rotary encoder means coupled to said sewing needle for generating timing signals to synchronoize the operation of said data processor means with the sewing movements of said sewing needle.

59. The sewing control system of claim 45 or claim 58 wherein said bight changing means comprises a reversible bight solenoid having a first bight coil for changing the bight of said sewing needle in a first bight direction and a second bight coil for changing the bight of said sewing needle in a second bight direction opposite to said first bight direction, and wherein said bight driving signals generated by said data processing means include positive bight driving signals corresponding to a change in the bight of said sewing needle in said first bight direction and negative bight driving signals corresponding to a change in the bight of said sewing needle in said second bight direction.

60. The sewing control system of claim 59 wherein said workpiece feeding means comprises a reversible feed solenoid having a first feed coil for initiating feed displacement of said workpiece relative to said sewing needle in a first feed direction and a second feed coil for initiating feed displacement of said workpiece relative to said sewing needle in a second feed direction opposite to said first feed direction, and wherein said feed driving signals generated by said data processing means include positive feed driving signals corresponding to a feed displacement of said workpiece relative to said sewing needle in said first feed direction and negative bight driving signals corresponding to a feed displacement of said workpiece relative to said sewing needle in said second direction.

61. A sewing control system according to claim 60 further including:
a data latch coupled to said data processing means for accumulating said positive bight driving signals, said negative bight driving signals, said positive feed driving signals, and said negative feed driving signals;
first means for converting said accumulated positive bight driving signals into a corresponding positive bight driving current signal and for applying said positive bight driving current signal to said first bight coil;
second means for converting said accumulated negative bight driving signals into a correspondind negative bight driving current signal and for applying said negative bight driving current signal to said second bight coil;
third means for converting said accumulated positive feed driving signals into a corresponding positive feed driving current signal and for applying said positive feed driving current signal to said first feed coil;
fourth means for converting said accumulated negative feed driving signals into a corresponding negative feed driving current signal and for applying said negative feed driving current signal to said second feed coil;
means for detecting the actual bight position of said sewing needle and for producing a digital bight position signal corresponding thereto;
means for detecting the actual displacement of said workpiece with respect to said sewing needle and for generating a digital feed position signal corresponding thereto; and
switch means for selectively providing said digital bight position signal and said digital feed position signal to said data processing means.

62. A sewing control system of claim 61 wherein each of said first means, said second means, said third means, and said fourth means each comprises:
a low pass filter coupled to said data latch, a preamplifier connected to said low pass filter, and a current booster connected to said preamplifier for respectively supplying said positive bight driving current signal, said negative bight driving current signal, said positive feed driving current signal and said negative feed driving current signal to said first bight coil, said second bight coil, said first feed coil, and said second feed coil, respectively.

* * * * *

UNITED STATES PATENT AND TRADEMARK OFFICE
CERTIFICATE OF CORRECTION

PATENT NO. : 4,326,473
DATED : April 27, 1982
INVENTOR(S) : Teruo KIGAWA

It is certified that error appears in the above—identified patent and that said Letters Patent is hereby corrected as shown below:

Claim 12, line 1, change "1" to --11--.

Claim 13, line 1, change "1" to --11--.

Claim 28, line 4, delete "pl".

Signed and Sealed this

Third Day of August 1982

[SEAL]

Attest:

GERALD J. MOSSINGHOFF

*Attesting Officer*   *Commissioner of Patents and Trademarks*